United States Patent [19]
Clark

[11] Patent Number: 5,839,568
[45] Date of Patent: *Nov. 24, 1998

[54] RECIPROCATING FLOOR CONVEYOR CONTROL SYSTEM

[76] Inventor: Gary R. Clark, 3777 Waconda Rd., NE., Gervais, Oreg. 97026

[*] Notice: This patent issued on a continued prosecution application filed under 37 CFR 1.53(d), and is subject to the twenty year patent term provisions of 35 U.S.C. 154(a)(2).

[21] Appl. No.: 815,322

[22] Filed: Mar. 10, 1997

Related U.S. Application Data

[63] Continuation of Ser. No. 439,476, May 11, 1995, abandoned, which is a continuation of Ser. No. 192,500, Feb. 7, 1994, abandoned.

[51] Int. Cl.⁶ .................................................. B65G 25/00
[52] U.S. Cl. ....................................... 198/750.5; 414/525.9
[58] Field of Search ............................ 198/750.2, 750.5, 198/750.6; 414/525.1, 525.9

[56] References Cited

U.S. PATENT DOCUMENTS

| | | |
|---|---|---|
| 3,534,875 | 10/1970 | Hallstrom, Jr. . |
| 4,143,760 | 3/1979 | Hallstrom . |
| 4,144,963 | 3/1979 | Hallstrom . |
| 4,184,587 | 1/1980 | Hallstrom . |
| 4,474,285 | 10/1984 | Foster . |
| 4,508,211 | 4/1985 | Foster . |
| 4,571,150 | 2/1986 | Foster . |
| 4,580,678 | 4/1986 | Foster . |
| 4,691,819 | 9/1987 | Hallstrom, Jr. . |
| 4,709,805 | 12/1987 | Foster . |
| 4,712,467 | 12/1987 | Foster . |
| 4,748,893 | 6/1988 | Foster . |
| 4,748,894 | 6/1988 | Foster . |
| 4,793,468 | 12/1988 | Hamilton et al. . |
| 4,793,469 | 12/1988 | Foster . |
| 4,817,783 | 4/1989 | Foster . |
| 4,821,868 | 4/1989 | Foster . |
| 4,823,938 | 4/1989 | Foster . |
| 4,899,870 | 2/1990 | Foster . |
| 4,962,848 | 10/1990 | Foster . |
| 4,966,275 | 10/1990 | Hallstrom, Jr. . |
| 4,969,387 | 11/1990 | Foster . |
| 4,969,389 | 11/1990 | Foster . |
| 5,092,732 | 3/1992 | Foster . |
| 5,096,356 | 3/1992 | Foster . |
| 5,103,866 | 4/1992 | Foster . |
| 5,125,502 | 6/1992 | Foster . |
| 5,193,661 | 3/1993 | Foster . |
| 5,222,593 | 6/1993 | Quaeck . |
| 5,310,044 | 5/1994 | Quaeck . |
| 5,325,957 | 7/1994 | Wilkens . |
| 5,340,264 | 8/1994 | Quaeck .............................. 198/750.3 |
| 5,383,548 | 1/1995 | Quaeck .............................. 198/250.6 |

*Primary Examiner*—Joseph E. Valenza
*Attorney, Agent, or Firm*—Reising, Ethington, Learman & McCulloch

[57] ABSTRACT

The reciprocating floor conveyor (10) has a frame (14) guide beam assemblies (46) and floor slats (50) slidably mounted on the guide beam assemblies. An A group of floor slats (50) are connected to a transverse drive beam (100) and reciprocated back and forth by a hydraulic cylinder (116). A B group of floor slats (50) are connected to a transverse drive beam (102) and reciprocated back and forth by a hydraulic cylinder (124). A C group of floor slats (50) are connected to a transverse drive beam (104) and reciprocated back and forth by a hydraulic cylinder (130). Solenoid operated control valves (152, 154 and 156) direct hydraulic fluid to the respective cylinders (116, 124 and 130). A logic control unit (210) determines the positions of the A, B and C groups of floor slats as indicated by sensors (174, 176, 178, 180, 182 and 188) and energizes the solenoid operated control valves (152, 154 and 156) to reciprocate the A, B and C groups of floor slats and convey material supported by the floor slats. The logic control unit (210) is reversible to convey material toward a front end or a rear end of the floor slats.

21 Claims, 9 Drawing Sheets

FORWARD POSITION

REARWARD POSITION

FORWARD POSITION

REARWARD POSITION

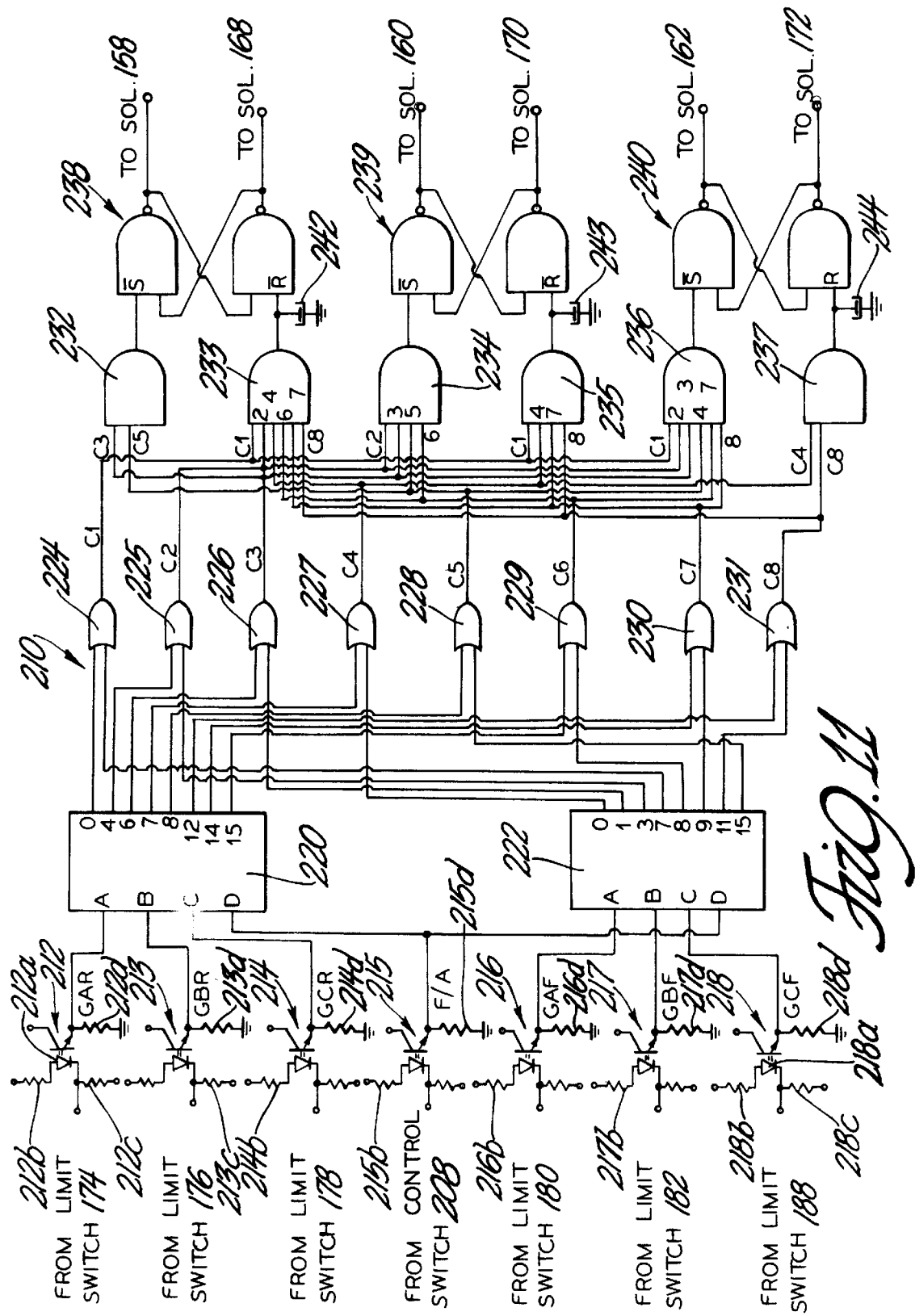

RECIPROCATING FLOOR CONVEYOR CONTROL SYSTEM

CROSS REFERENCE TO RELATED APPLICATIONS

This application is a continuation of application Ser. No. 08/439,476 filed May 11, 1995, now abandoned, which is a continuation of application Ser. No. 08/192,500 filed Feb. 7, 1994, also now abandoned.

TECHNICAL FIELD

This invention relates to a container floor with a plurality of floor slats and hydraulic cylinders for reciprocating the floor slats back and forth to unload the container and more particularly to a control system for controlling the flow of hydraulic fluid to the hydraulic cylinders to reciprocate the floor slats.

BACKGROUND OF THE INVENTION

Containers with reciprocating floor conveyors are frequently mounted on wheels to form a semitrailer or directly on a truck chassis for transporting bulk materials such as sawdust, wood chips, bark, chopped plant material for animal feed, plant material for human consumption or sewage sludge. Containers with reciprocating floor conveyors are also used in material handling facilities to convey material and to control the rate at which material is fed.

A reciprocating floor conveyor has a plurality of relatively narrow floor slats extending substantially the length of the conveyor. The floor slats are mounted on bearings for reciprocating movement back and forth in paths that are parallel to each other. The material to be conveyed is supported by the floor slats. To advance material supported on a plurality of floor slats, all of the floor slats can be advanced together in one direction carrying the material they support with them. The floor slats are then retracted in small groups. The floor slats that are not being retracted hold the material while some floor slats are retracted and slide relative to the material being supported. After one group of floor slats is retracted, another group is retracted. After all the groups of floor slats are retracted, all of the floor slats are again advanced together in one direction carrying the material they support with them. This operating cycle continues until all of the material supported on the floor slats is discharged from one end of the floor slats.

A frictional force exists between the surface of the floor slats and the material supported by the floor slats. The material advances or moves when the floor slat surfaces that are advancing exert more force on the material than the surfaces that are not advancing. The force exerted on the material by container walls and other surfaces of the container affect conveying as well as the material support surfaces of the floor slats. Material will move anytime sufficient force is exerted on the material in one direction to overcome the force exerted on the material in the opposite direction.

A common floor slat conveyor arrangement is to divide the floor slats into three groups with every third floor slat in group one, every third floor slat in group two and the remaining floor slats in group three. The floor slats in each group are connected together and reciprocate back and forth together as a group. With this arrangement, the floor slats of groups one, two, and three are advanced together taking the material on the floor slats with them. The floor slats in group one are then retracted. The floor slats in groups two and three hold the material in place while the floor slats in group one are retracted and slide relative to the material supported by the floor slats. The floor slats in group two are then retracted while the material being conveyed is held in place by the stationary floor slats in groups one and three. After the floor slats in group two are retracted, the floor slats in group three are retracted and the floor slats in groups one and two hold the material being conveyed. After the floor slats are all retracted, they are again advanced together and the material being conveyed is again advanced. The reciprocating movement continues until all the material is discharged from one end of the floor slats.

The reciprocating floor conveyor described above has three groups of floor slats that extend substantially the width of the floor. Other arrangements of floor slats have been used and are available. There could for example be four or more groups of floor slats. There could also be some fixed floor slats that do not reciprocate. It is also possible to advance some floor slats while other floor slats are retracted. Any arrangement of floor slats which advances material toward a discharge when some of the floor slats are advanced and which do not move material away from the discharge when floor slats are retracted will work.

Hydraulic systems, that are in current use with reciprocating floor conveyors, have a reversing valve that is switched mechanically upon all of the floor slats reaching their limit of movement in a given direction. These systems also have valves that are mechanically opened, when one group of floor slats reaches a limit of movement during retraction, to allow another group of floor slats to be retracted. These valves are large and expensive and are prone to sticking. They can stick due to hydraulic oil contamination and due to mud, water, dirt and other contamination contacting the surfaces of their control rods. A stuck valve will normally allow the passage of hydraulic fluid when it should not and move a floor slat when the floor slat is to be stationary or move a floor slat in the wrong direction.

Adjustments in the distance the floor slats move may be desirable. If a reciprocating floor conveyor is feeding material to a material sorter or processor for example, it may be desirable to shorten the distance the floor slats move to deliver less material during each advance of the floor slats. Adjustment of the distance the floor slats move in one direction is relatively difficult and time consuming with the current systems. In some current systems, it is very difficult to change the distance the floor slats move and changing the distance can move the slat discharge away from the discharge opening.

A reversal of the direction material is conveyed by a reciprocating floor conveyor may be desirable. In a material processing facility it may be desirable to elect to discharge material at one end or the other end of the floor slats. In a transport vehicle it may be desirable to reciprocate the floor slats to move material in one direction to fill the transport container and to move material in another direction to unload the transport container. It is difficult and expensive to reverse the direction in which material is conveyed by reciprocating floor conveyors that are currently in use. Due to the difficulty and expense, the direction reciprocating floor conveyors convey material is generally not reversed.

SUMMARY OF THE INVENTION

An object of the invention is to provide an electrohydraulic control system for a reciprocating floor conveyor.

A further object of the invention is to provide a control system for a reciprocating floor conveyor which is protected from water, dirt and other contaminants.

A still further object of the invention is to provide an electrohydraulic control system for a reciprocating floor conveyor that can reverse the direction material is conveyed.

Another object of the invention is to provide an electrohydraulic control system for a reciprocating floor conveyor that accommodates changes in the stroke or distance floor slats move in one direction.

The reciprocating floor conveyor is mounted on a frame that includes cross beams. Floor slat guide tubes or bars are attached to the cross beams to guide each floor slat. Each guide tube extends substantially the length of the reciprocating floor conveyor. One or more floor slat support bearings are mounted on each guide tube. A floor slat is mounted on the floor slat support bearing or bearings mounted on each guide tube.

The floor slats are reciprocated back and forth by a floor slat drive system. The floor slat drive system includes a transverse drive beam for each group of floor slats. A first drive beam for a first group of floor slats is connected to the bottom of each floor slat in the first group. A second drive beam for a second group of floor slats is connected to the bottom of each floor slat in the second group of floor slats. A third drive beam for a third group of floor slats is connected to the bottom of each floor slat in the third group of floor slats if a third group of floor slats is used. Additional drive beams are connected to additional groups of floor slats if the floor slats are divided into four or more groups.

A first hydraulic cylinder is connected to the first floor slat drive beam to reciprocate the first floor slat drive beam and the floor slats connected to the first floor slat drive beam back and forth. A second hydraulic cylinder is connected to the second floor slat drive beam to reciprocate the second floor slat drive beam and the floor slats connected to the second floor slat drive beam back and forth. A third hydraulic cylinder is connected to the third floor slat drive beam to reciprocate the third floor slat drive beam and the floor slats connected to the third floor slat drive beam back and forth. If only two groups of floor slats are reciprocated back and forth, the third drive beam can be eliminated. If more than three groups of floor slats are employed a floor slat drive beam is provided for each additional group of floor slats and a hydraulic cylinder is provided to reciprocate each additional drive beam and the connected floor slats back and forth.

A hydraulic system including a hydraulic pump supplies hydraulic fluid under pressure to the hydraulic cylinders. The flow of hydraulic fluid to and from the hydraulic cylinders is controlled by a reciprocating floor conveyor control system. The reciprocating floor conveyor control system includes a master control system electric power switch, a primary function control switch, limit switches, solenoid actuated hydraulic control valves, and a logic control unit. The master control system electric power switch is operated by hydraulic fluid pressure to pass electric current to the reciprocating floor conveyor electrohydraulic control system only when hydraulic fluid under pressure is supplied to the solenoid actuated hydraulic control valves. The primary function control switch is a manually operated three position switch. In one position the primary function control switch interrupts control system operating current and prevents switching of the solenoid actuated hydraulic control valves. In a second position the primary function control switch passes system operating current to the logic control unit to operate the reciprocating floor conveyor in a sequence that conveys material supported by the floor slats toward a rear discharge. In a third position the primary function control switch passes system operating current to the logic control unit to operate the reciprocating floor conveyor in a sequence that conveys bulk material supported by the floor slats toward the front end of the floor slats. There may be a second material discharge opening at the front end of the floor slats if a second discharge is required. The limit switches are preferably solid state electronic proximity sensing limit switches. Two limit switches are employed with each group of floor slats that are interconnected to move together. One of the limit switches closes when the group of floor slats it is associated with reaches the rearmost point of movement of the floor slats. The other limit switch closes when the group of floor slats it is associated with reaches the forwardmost point of movement of the floor slats. A reciprocating floor conveyor with three groups of floor slats has six limit switches. The distance the floor slats move between their forwardmost position and their rearmost position can be adjusted by mechanically limiting the stroke of the hydraulic cylinders. The limit switches are adjusted, as required, to correspond to the actual forward most and rearmost positions.

The solenoid actuated hydraulic control valves are three position spool valves. The valve spool of each valve is spring biased toward a center position in which the flow of hydraulic fluid to or from a linear actuator is blocked and the group of floor slats moved by the linear actuator are held in a fixed position. A first solenoid, when energized moves the valve spool in a first direction, connects one end of a linear actuator to a source of hydraulic fluid under pressure and connects the other end of the linear actuator to a sump thereby moving the group of floor slats toward the rear discharge. A second solenoid, when energized moves the valve spool in a second direction, connects one end of the linear actuator to a sump and connects the other end of the linear actuator to a source of hydraulic fluid under pressure thereby moving the group of floor slats toward the forward end of their range of movement. The logic control unit employs integrated circuit chips which receive current from the primary function control switch and from the six limit switches and activate the solenoids to direct hydraulic fluid to and from the linear actuators as required to move bulk material supported by the floor slats toward the rear end of the floor slats or toward the forward end of the floor slats.

The logic control unit will, when the primary function control switch is in the second or rear position, sense that all of the forward limit switches are closed indicating that all the floor slats are in their forward position. The logic control unit will then deenergize the second solenoid and energize the first solenoid on each solenoid actuated control valve thereby directing hydraulic fluid to all the linear actuators and moving all the floor slats and the bulk material they support to the rear together. When all of the groups of floor slats have reached their rear limit of travel, the first solenoid on the hydraulic control valve for the linear actuator that moves the first group of floor slats is deenergized and the second solenoid of that same hydraulic control valve is simultaneously energized to move the spool in a second direction and direct hydraulic fluid to the linear actuator and move the first group of floor slats toward their forward limit of travel. Upon reaching the forward limit of travel, the forward limit switch for the first group of floor slats is closed, the first solenoid on the control valve for the linear actuator that moves the second group of floor slats is deenergized and the second solenoid on that same hydraulic control valve is energized to move the spool in a second direction and direct hydraulic fluid to the linear actuator and move the second group of floor slats toward their forward limit of travel. Upon the second group of floor slats reaching their forward limit of travel, the forward limit switch for the second group of floor slats is closed. Upon sensing that the second group of floor slats has reached its forward limit of travel, the first solenoid on the control valve for the linear actuator that moves the third group of floor slats; if there is a third group of floor slats, is deenergized and the second solenoid on that same hydraulic control valve is energized to move the spool in a second direction and direct hydraulic fluid to the linear actuator and move the third group of floor slats toward their forward limit of travel. Upon the third group of floor slats reaching their forward limit of travel, the forward limit switch for the third group of floor slats is closed. With all the forward limit switches indicating that all groups of floor slats are in their forward position the cycle is repeated.

Placing the primary function control switch in the third or forward position results in the logic control unit activating the solenoid actuated control valves to move all three groups of floor slats forward together and then move one group of floor slats at a time to the rear. In this mode the third group of floor slats is moved to the rear then the second group is moved to the rear and then the first group is moved to the rear. When all three groups of floor slats are in their rearmost positions, the cycle is repeated.

The logic control unit can be located in any convenient location. It can be enclosed and protected from the elements or it can be mounted in a clean dry position. The solenoid actuated control valves are normally mounted reasonably close to the linear actuators to shorten the hydraulic fluid lines that connect the linear actuators to the control valves. The solenoid actuated control valves can be mounted in a location which is convenient for service and can if desired be enclosed in an enclosure. However, it is not normally necessary to protect solenoid actuated valves from environmental elements. The logic control unit needs to be protected from vibration and heat. High temperatures can also damage hydraulic systems. Hydraulic fluid cooling can be provided if required.

The foregoing and other objects, features and advantages of the present invention will become apparent in light of the following detailed description of an exemplary embodiment thereof as illustrated in the accompanying drawing.

BRIEF DESCRIPTION OF THE DRAWING

FIG. 11 is a schematic view of the logic control unit;

DESCRIPTION OF THE PREFERRED EMBODIMENT

Figure 1:
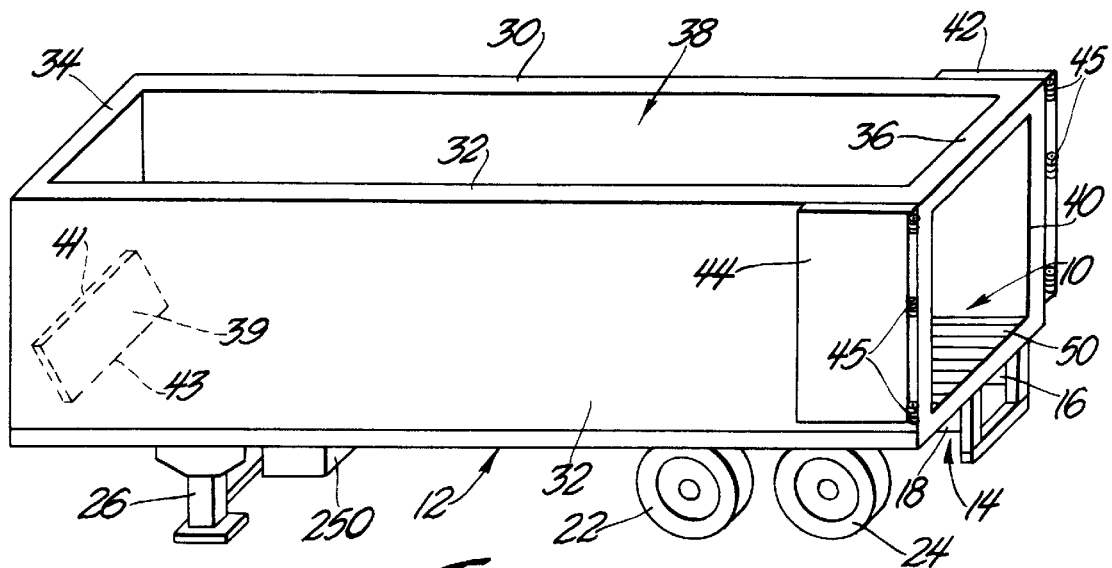
FIG. 1 is a perspective view of a semitrailer employing a reciprocating floor conveyor for conveying bulk material.
Figure 3:
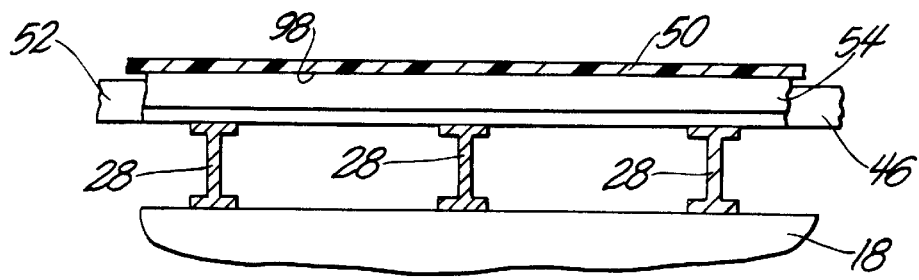
FIG. 3 is an enlarged sectional view of a portion of a reciprocating floor conveyor with a floor slat added taken along line 3—3 in FIG. 2.
Figure 2:
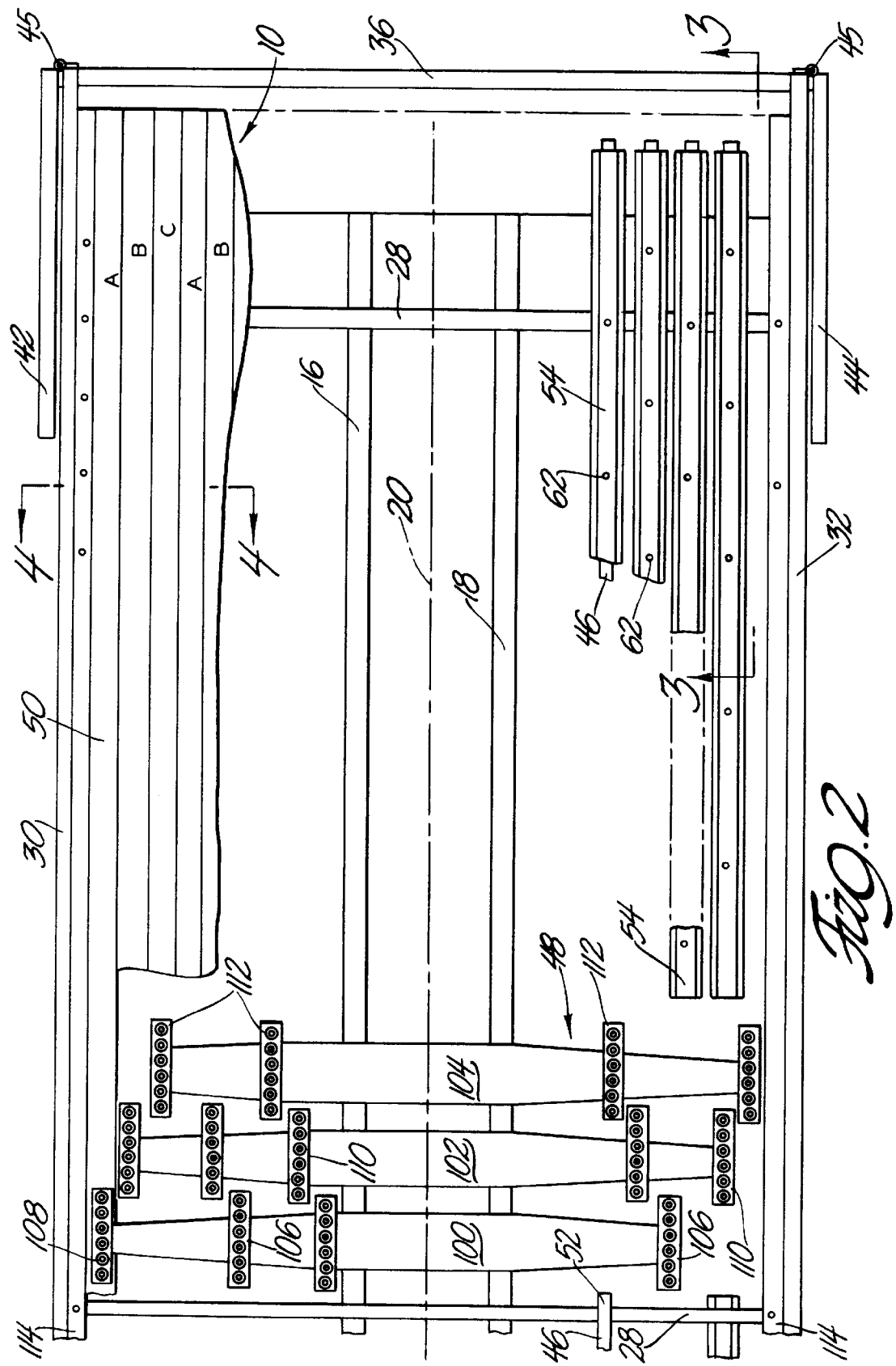
FIG. 2 is a plan view of a portion of the reciprocating floor conveyor in a semitrailer with some parts removed and other parts broken away to show the floor construction.

The reciprocating floor conveyor 10 for conveying bulk materials is shown in the drawing as part of a semitrailer 12. The reciprocating floor conveyor 10 could be part of a van type body mounted on a truck chassis. The semitrailer 12, as shown in FIGS. 1 and 2, has a main frame 14 which includes a pair of spaced apart channel members 16 and 18 that are parallel to a central axis 20 running the length of the semitrailer. The rear portion of the semitrailer 12 is supported by wheels and tires 22 and 24 that are rotatably journaled on conventional axles attached to the main frame 14 by a conventional suspension system (not shown). The front portion of a semitrailer 12 is supported by an adjustable landing gear 26 when the semitrailer is not connected to a tractor towing vehicle. A hitch pin (not shown), for attaching the semitrailer 12 to a fifth wheel on a tractor, is attached to the bottom side of the main frame 14 on the central axis 20 of a semitrailer 12 forward of the landing gear 26. The channel members 16 and 18 end at a point to the rear of the hitch pin and are indirectly attached to the hitch pin to keep the height of the reciprocating floor conveyor 10 at the front of the semitrailer 12 at about the same height as the height of the reciprocating floor conveyor at the rear of the semitrailer.

A plurality of cross beams 28 that are transversed to the central axis 20 are attached to the main frame 14. The cross beams 28, as shown, are aluminum I-beams. The spacing of the cross beams 28 depends upon the intended use and the cargo the reciprocating floor conveyor 10 is to support. The cross beams 28 have been placed on twelve inch centers in some semitrailers 12. In other semitrailers 12, the center lines of the cross beams 28 have been as much as fifteen inches apart.

The right sidewall 30 is attached to the right hand ends of the cross beams 28. A left sidewall 32 is attached to the left hand ends of the cross beams 28. A front end wall 34 is attached to the right sidewall 30, the left sidewall 32 and to the front portion of the main frame 14. The top and bottom of the right sidewall 30, the left sidewall 32 and the front end wall 34 are reinforced to provide structural integrity. A top cross beam 36 is connected to the top of the right sidewall 30 and the left sidewall 32 at the rear of the semitrailer 12 to reinforce the cargo container 38 and to define a rear discharge opening 40 that is substantially the same height and width as the cargo container 38. Doors 42 and 44 for closing the discharge opening 40 are attached to the right sidewall 30 and the left sidewall 32 by hinges 45. The top of the semitrailer is open for depositing cargo in the cargo container 38.

Figure 5:
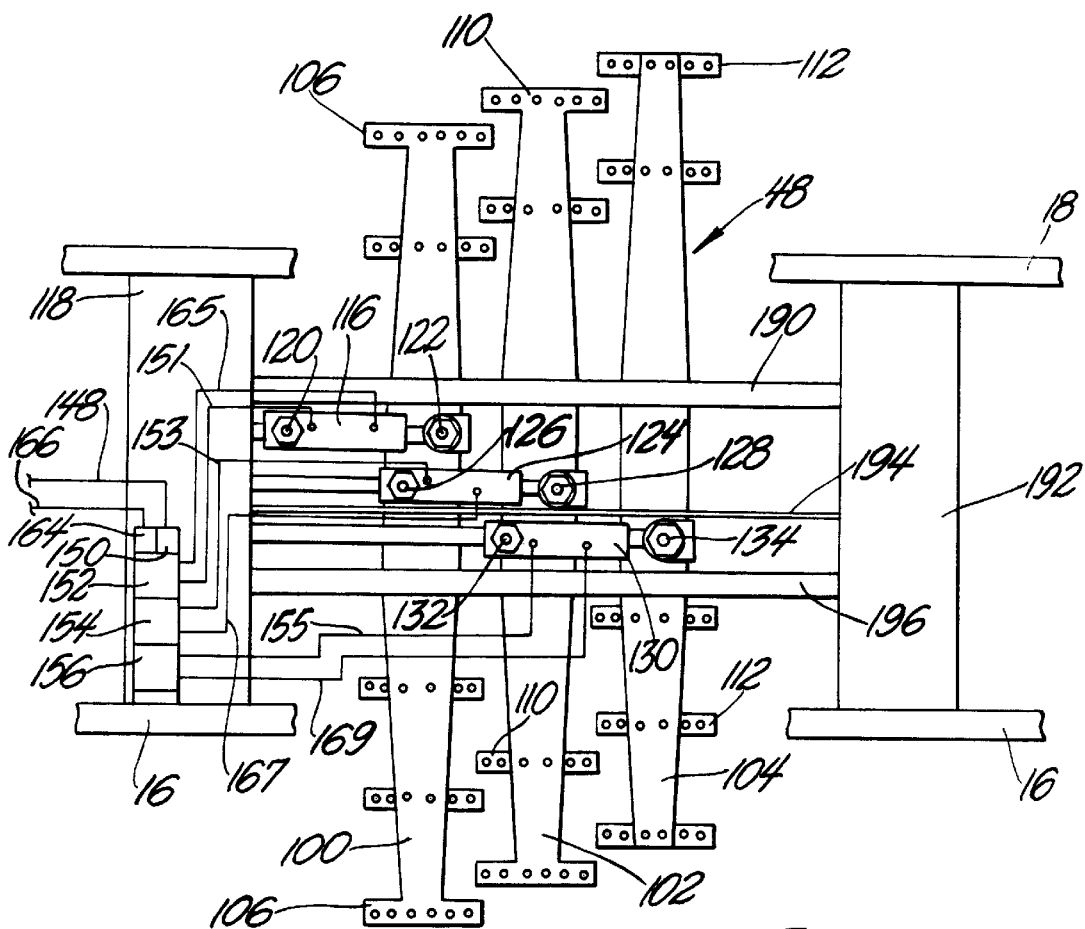
FIG. 5 is a bottom view of a floor slat drive.
Figure 6:
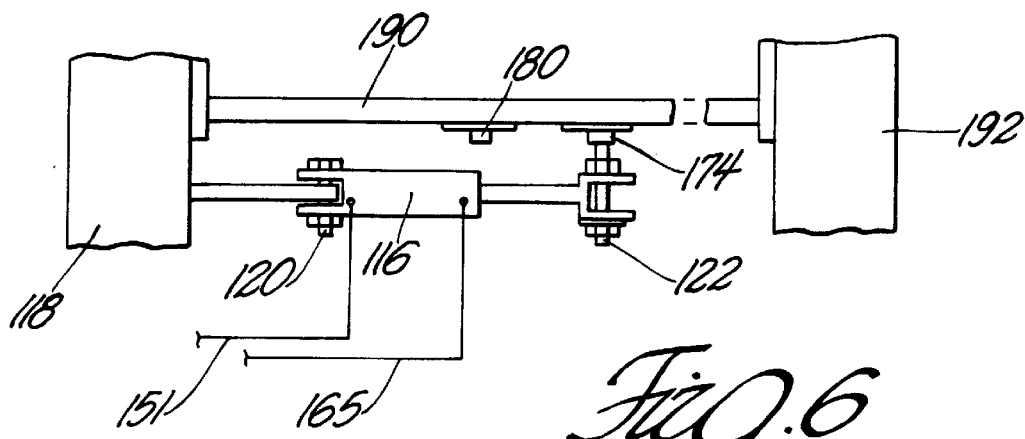
FIG. 6 is an enlarged plan view with parts broken away showing the limit switches for one of the floor slat drive cylinders.

A plurality of guide beam assemblies 46, that are parallel to the central axis 20 are welded to the tops of the cross beams 28. The guide beam assemblies 46 are tubes that extend substantially the entire length of the semitrailer 12. The guide beam assemblies 46 each have an end that is adjacent to the front end wall 34 and an end that is adjacent to the doors 42 and 44 when the doors are closing the rear discharge opening 40. There is a section removed from each guide beam assembly 46 in the center portion of the semitrailer 12 for a floor slat drive assembly 48, as shown in FIG. 5. The guide beam assemblies 46 are on centers that are spaced apart a distance equal to the width of the floor slats 50. If the width of each floor slat 50 is three and five eights of an inch, center lines of the guide beam assemblies 46 are also three and five eighths of an inch apart. The number of guide beam assemblies 46 required depends upon the inside width of the cargo container 38 and the width of the floor slats 50. In some reciprocating floor conveyors 10, twenty-four or even more guide beam assemblies 46 are required.

Figure 4:
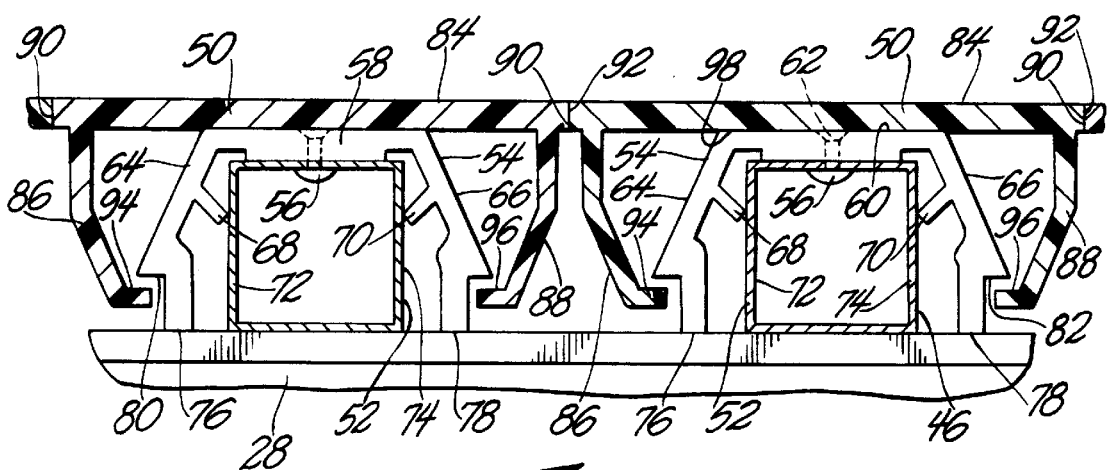
FIG. 4 is an enlarged sectional view of a portion of a reciprocating floor conveyor taken along line 4—4 in FIG. 2.

The guide beam assembly 46, is shown in FIG. 4 as a square tube 52. The square tube 52 is parallel to the central axis 20 and is welded to the cross beams 28. As shown in FIG. 2 a section of each guide beam assembly 46 has been removed to provide space for the floor slat drive assembly 48. It would be possible to design a floor slat drive assembly 48 that does not require the removal of a section of each guide beam assembly 46. The floor slat drive assembly 48 could, for example, be attached to the ends of floor slats 50 rather than being attached some place between the forward end and the rear end of each floor slat. The square tube 52 can vary in size. The size depends upon the width of the floor slat 50, the strength required and the desire of the manufacturer. One manufacturer has used one inch square tubing. The wall thickness of the tube 52 can also vary to provide the required strength. If necessary, the tube 52 could be a solid rod.

A bearing 54 is attached to the guide beam assembly 46 by rivets 56, bolts or other suitable fasteners. The bearing 54 preferably extends the entire length of the guide beam assembly 46. It may, however, be necessary to remove a portion of the bearing 54 to provide space for the floor slat drive assembly 48. A portion can be removed by using two bearings 54 of the required lengths for each section of the guide beam assembly 46. The front section of the guide beam assembly 46 extends from the front end wall 34 to the floor slat drive assembly 48. The rear section of the guide beam assembly 46 extends from the floor slat drive assembly 48 to the rear discharge opening 40. The bearings 54 are made from a low friction material. Extrusion is a preferred method of forming the bearings 54 but they could also be cast. A thermoplastic resin such as alatron is a suitable material for use for the bearings 54.

The bearing 54, shown in FIG. 4, has a generally horizontal upper section 58 with an upwardly facing bearing surface 60. The rivets 56 which attach the bearings 54 to the guide beam assemblies 46 are countersunk in the generally horizontal upper section 58 so that the tops of their heads 62 are below the upwardly facing bearing surface 60. Sidewalls 64 and 66 of the bearings 54 are integral with the generally horizontal upper section 58 and extend downwardly from the upper section. The sidewalls 64 and 66 have flanges 68 and 70 which contact the sides 72 and 74 of the guide beam assembly 46 to laterally position the bearing 54 on the guide beam assembly. The lower surfaces 76 and 78 of the sidewalls 64 and 66 contact the tops of the cross beams 28 to provide support to the sidewalls, as shown in FIG. 4. Each sidewall 64 and 66 includes a downwardly facing horizontal floor slat retainer surface 80 or 82. The function of the floor slat retainer surfaces 80 and 82 is described below.

The floor slats 50 can take many forms and can be made from different materials. Floor slats 50 are, however, frequently aluminum extrusions with a horizontal upper section 84 and downwardly extending integral side walls 86 and 88 that form a channel shaped member. The sides of the horizontal upper section 84 have generally vertical bearing surfaces 90 and 92. The generally vertical bearing surfaces 90 and 92 contact the bearing surfaces on adjacent floor slats 50 to limit lateral movement of the floor slats and to support the lateral forces when the reciprocating floor conveyor is tilted to one side. The vertical bearing surfaces 90 and 92 also function as sealing surfaces to prevent the loss of cargo between adjacent floor slats 50. Generally horizontal flanges 94 and 96 are integral with the side walls 86 and 88. The horizontal flanges 94 and 96 extend inwardly toward each other. The horizontal flanges 94 and 96 also cooperate with the floor slat retainer surfaces 80 and 82 on the sidewalls 64 and 66 of the bearings 54 to limit vertical movement of the floor slats 50 relative to the bearings. The floor slats 50 can be installed by sliding them onto the bearings 54 from the ends of the bearings. The floor slats 50 can also be installed by forcing them vertically downward on the bearings 54 thereby deflecting the sidewalls 64 and 66 of the bearings inward until the floor slats snap into place and the sidewalls return to their original shape. The floor slats 50 extend substantially the entire length of the semitrailer 12 in which the reciprocating floor conveyor 10 is mounted. With the longer semitrailers that are now in use, floor slats 50 may be around sixty feet long. The upwardly facing bearing surface 60 of the bearings 54 are in sliding contact with the bottom surface 98 of the horizontal upper section 84 of the floor slats 50 over substantially the entire length of the floor slats. The generally horizontal flanges 94 and 96 are held up out of contact with the cross beams 28 by the bearings 54 to prevent wear on the side walls 86 and 88 that would weaken the floor slats 50 and reduce their useful life.

The floor slat drive assembly 48 includes transverse drive beams 100, 102 and 104 shown in FIGS. 2 and 5. The first transverse drive beam 100 has a plurality of spaced apart floor slat connectors 106 that are connected to the first group of floor slats 50, marked with the letter A in FIG. 2, by bolts 108. Some of the floor slat connectors 106, 110 and 112 have been removed in the drawing for clarity. The second transverse drive beam 102 has a plurality of spaced apart floor slat connectors 110 which are connected to the second group of floor slats 50, marked with the letter B in FIG. 2, by bolts 108. The floor slats 50 in the second group of floor slats are on the left side of each A floor slat as shown in FIG. 2. The third transverse drive beam 104 has a plurality of spaced apart floor slat connectors 112 which are connected to the third group of floor slats 50, marked with the letter C in FIG. 2, by bolts one08. The floor slats 50 in the third group of floor slats are positioned between B and A floor slats. The bearing surfaces 90 and 92 on each of the floor slats are in sealing contact with bearing surfaces on the floor slats adjacent to their right and left sides. At the right and left edges of the reciprocating floor conveyor 10 adjacent to the right sidewall 30 and the left sidewall 32 is a nonreciprocating half floor slat 114. A floor slat 50 has been cut through the horizontal upper section 84 along its entire length to make two half floor slats 114. The left half of a floor slat 50 becomes the half floor slat 114 that is bolted to the cross beams 28 adjacent to the right side wall 30 with its integral left side wall 86 to the left. The right half of a floor slat 50 becomes the half floor slat 114 that is bolted to the cross beams 28 adjacent to the left sidewall 32 with its right integral sidewall 88 to the right. The two half floor slats 114 can be adjusted horizontally toward and away from the central axis 20 of the trailer to establish sealing contact between all the floor slat vertical bearing surfaces 90 and 92. The horizontal adjustment of the half floor slats 114 toward or away from the central axis 20 can be made at the time of assembly or slots can be provided for the bolts that secure the half floor slats to the cross beams 28 to facilitate field adjustment. The floor slats 50 can move laterally on the slide bearings 54 toward or away from the centerline 20 to ensure that the bearing surfaces 90 and 92 are in sealing contact with the bearing surfaces on adjacent floor slats. Reciprocating floor conveyors 10 associated with cargo containers 38 that have a fixed front end wall 34 are preferably provided with a conveyor and shield 39 that keeps cargo from contacting the forward ends of the floor slats 50. The conveyor end shield 39 is secured to the walls 30 and 32. The top edge 41 of the conveyor end shield 39 is secured to the front end wall 34. the bottom edge 43 of the conveyor end shield 39 is slightly above the floor slats 50 and spaced to the rear of the front end wall 34 a sufficient distance to cover the forward ends of the floor slats 50 when the floor slats are in their rear most position.

A first linear actuator or hydraulic cylinder 116 is connected to a fixed cross beam 118 by a pin 120 and to the first transverse drive beam 100 by a pin 122. The fixed cross beam 118 is welded or bolted to the channel members 16 and 18 of the mainframe 14. A second linear actuator or hydraulic cylinder 124 is connected to the fixed cross beam 118 by a pin 126 and to the second transverse drive beam 102 by a pin 128. A third linear actuator or hydraulic cylinder 130 is connected to the fixed cross beam 118 by a pin 132 and to the third transverse drive beam 104 by a pin 134.

The cylinders 116, 124 and 130 are pivotally connected to the transverse drive beams 100, 102 and 104 below the floor slats 50. The force exerted on the transverse drive beams 100, 102 and 104, to reciprocate the floor slats 50, tends to rotate each transverse drive beam about an axis perpendicular to the central axis 20. The torque which tends to rotate the transverse drive beams 100, 102 and 104 can be countered by the floor slats 50 or a separate drive beam guide system can be provided to limit rotation of the transverse drive beams.

Figure 7:
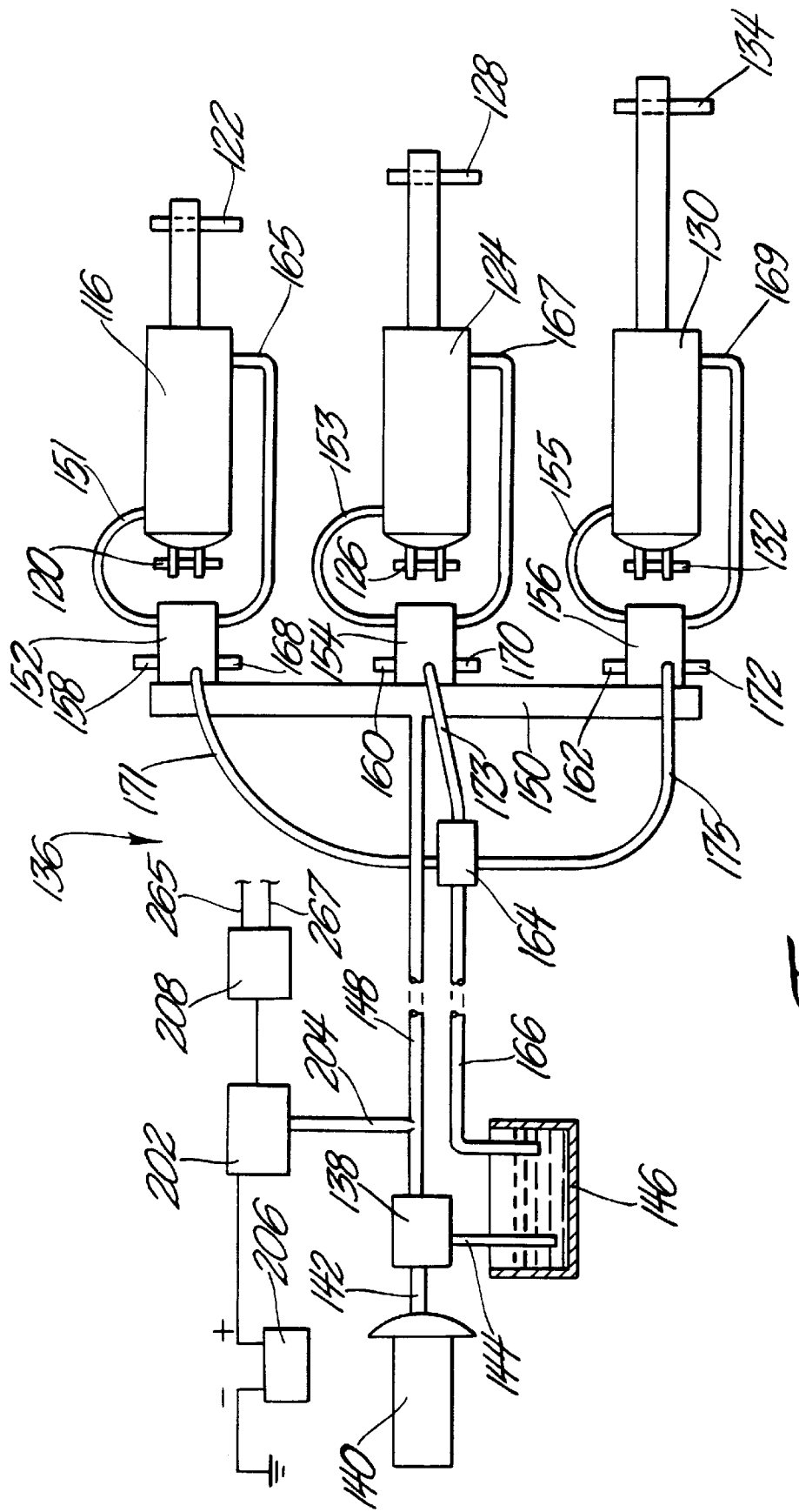
FIG. 7 is a schematic view of a floor slat drive system.

Hydraulic fluid is supplied to the hydraulic cylinders 116, 124 and 130 by a hydraulic floor slat drive system 136 shown in FIG. 7. The floor slat drive system 136 includes a pump 138 driven by an engine 140. In a mobile system the engine 140 is an internal combustion engine in a tractor towing vehicle which propels the cargo container 38. The pump 138 is driven by a drive shaft 142 from a power take off on the vehicle transmission. A clutch (not shown) is provided in the power take off drive train to engage and disengage the drive to the pump 138. The pump 138 draws hydraulic fluid through a pipe 144 from a sump 146 and delivers hydraulic fluid under pressure through a pipe 148 to a pressure manifold 150. The pressure manifold 150 is preferably mounted on the fixed cross beam 118 of the main frame 14 near the first, second and third hydraulic cylinders 116, 124 and 130. Three solenoid actuated spool valves 152, 154 and 156 are mounted directly on the pressure manifold 150 and receive hydraulic fluid under pressure from the pressure manifold. Each solenoid actuated spool valve 152, 154 or 156 has three positions. The spool is spring biased into a center position in which the flow of hydraulic fluid to or from a hydraulic cylinder 116, 124 or 130 is blocked. A first solenoid 158, 160 or 162 on each solenoid operated spool valve 152, 154 or 156 moves the spool when energized into a position in which the head end of the hydraulic cylinder 116, 124 or 130 is connected to the pressure manifold 150 by pipe 151, 153 or 155 and the rod end of each hydraulic cylinder is connected to a sump manifold 164 by pipe 165, 167 or 169. The sump manifold 164 is connected to the sump 146 by a pipe 166. A second solenoid 168, 170 or 172 on each solenoid operated spool valve 152, 154 or 156 moves the spool, when energized, into a position in which the rod end of the hydraulic cylinder 116, 124 or 130 is connected to the pressure manifold 150 by pipe 165, 167 or 169 and the head end of each hydraulic cylinder is connected to the sump manifold 164 by pipe 151, 153 or 155. The sump manifold 164 can be connected directly to the spool valves 152, 154 and 156 or it can be connected by lines 171, 173 and 175, as shown in FIG. 7.

Figure 8:
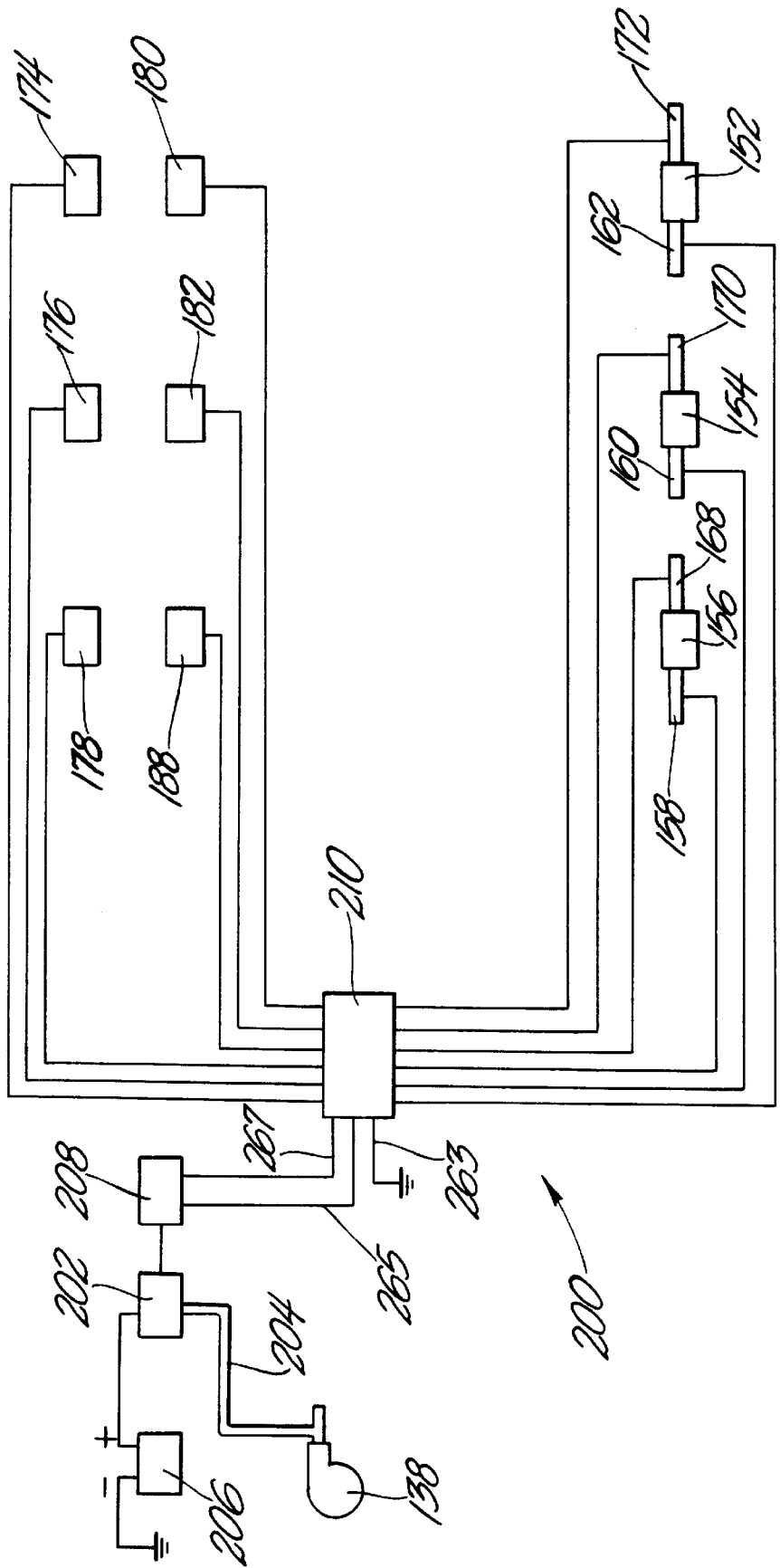
FIG. 8 is a schematic view of a control system for a floor slat drive.

Limit switches 174, 176, 178, 180, 182 and 188, shown in FIG. 8, are mounted adjacent to the hydraulic cylinders 116, 124 and 130 to sense the limit of rear movement and the limit of forward movement of the floor slats 50 in each of the groups A, B and C of floor slats. The limit switches 174, 176, 178, 180, 182 and 188 are preferably solid state electronic proximity sensing limit switches. The limit switch 174 is clamped to a limit switch support beam 190 on one side of the first linear actuator 116. The limit switch 174 detects the pin 122 when the first hydraulic cylinder 116 has moved the first transverse drive beam 100 toward the rear to a predetermined position. The limit switch 180 is clamped to the limit switch support beam 190 and detects the end of the pin 122 when the first hydraulic cylinder 116 has moved the first transverse drive beam 100 toward the front to a predetermined position. The limit switch support beam 190 is bolted to the fixed cross beam 118 and to a fixed cross beam 192. The fixed cross beam 192 is welded or bolted to the channel members 16 and 18 of the mainframe 14. The limit switch support beam 190 is preferably horizontally adjustable relative to the fixed cross beams 118 and 192 to control the horizontal distance between the limit switches 174 and 180 and the end of the pin 122 when the pin is transversely spaced from the limit switch. The limit switches 174 and 180 are adjustably mounted on the limit switch support beam 190. The limit switch 174 is adjustable along the length of the limit switch support beam to a position that coincides with the location of the rearward limit of movement of the first transverse drive beam 100. The limit switch 180 is adjustable along the length of the limit switch support beam 190 to a position that coincides with the location of the forward limit of movement of the first transverse drive beam 100. The limit switches 176 and 182 are adjustably mounted on a limit switch support beam 194 that is identical to the limit switch support beam 190. The limit switches 176 and 182 detect the presence of the pin 128, which connects the second hydraulic cylinder 124 to the second transverse drive beam 102. The limit switches 178 and 188 are adjustably mounted on a limit switch support beam 196 that is identical to the limit switch support beams 190 and 194. The limit switches 178 and 188 detect the presence of the pin 134, which connects the third hydraulic cylinder 130 to the third transverse drive beam 104.

The solenoid actuated spool valves 152, 154 and 156, which control the flow of hydraulic fluid to and from the hydraulic cylinders 116, 124 and 130, are controlled by a reciprocating floor conveyor control system 200 shown in FIG. 8. The reciprocating floor conveyor control system 200 includes a master control system electric power switch 202. The master control system electric power switch 202 is a hydraulic fluid operated pressure switch that is normally open. When the hydraulic pump 138 is running and the pressure is sufficient to drive the reciprocating floor conveyor 10, hydraulic fluid in the line 204 supplies fluid to the master control system electric power switch 202 and closes the switch. The closed master control system electric power switch 202 connects the battery 206 or another source of electric power to the primary function control switch 208.

The purpose of the master control system electric power switch 202 is to supply power to the primary function control switch 208 only when there is sufficient hydraulic fluid pressure to operate the reciprocating floor conveyor 10.

The primary function control switch 208 is a three position manually operated switch. The primary function control switch 208 is normally mounted in the operator's compartment of a vehicle equipped with a container that has a reciprocating floor conveyor 10. The primary function control switch 208 can be mounted in other locations that are convenient for the operator of the reciprocating floor conveyor 10 and it would be possible to provide multiple primary function control switches in different positions if needed. The primary function control switch 208 has an off position in which the circuit is open and no power is supplied to the logic control unit 210, the solenoids 158, 160, 162, 168, 170 and 172 or the limit switches 174, 176, 178, 180, 182 and 188. The primary function control switch 208 can be manually switched to a "rear" position in which power is supplied to the logic control unit 210 and the solenoid actuated spool valves 152, 154 and 156 are manipulated by the logic control unit to move material supported by the floor slats 50 toward the rear discharge opening 40. The primary function control switch 208 can also be manually switched to a "front" position in which power is supplied to the logic control unit (LCU) 210 and the solenoid actuated spool valves 152, 154 and 156 are manipulated by the logic control unit to move material supported by the floor slats 50 toward the front of the container 38 and into contact with the front end wall 34 or through a front discharge opening if such an opening is provided.

Figure 12:
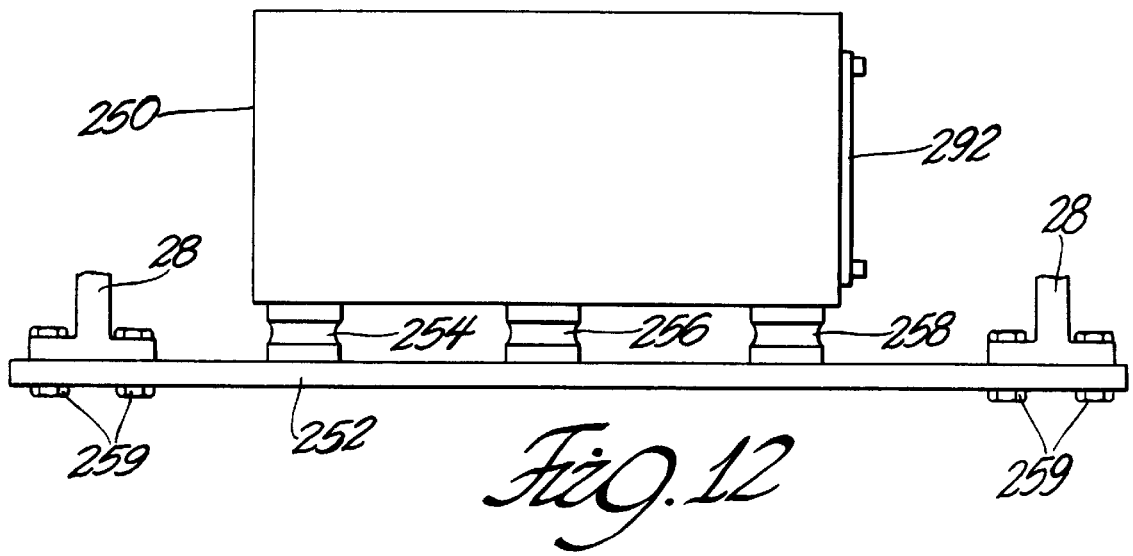
FIG. 12 is an enlarged view of the container for the logic control system and the mounting system for the logic control unit.
Figure 13:
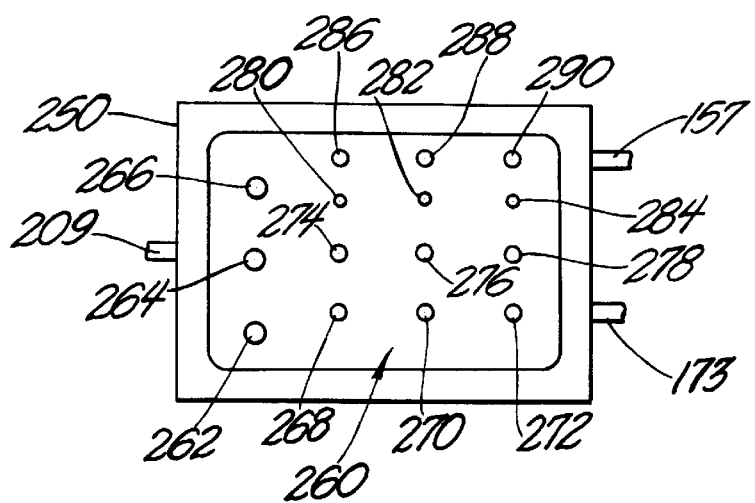
FIG. 13 is an elevational view of the terminals for the logic control unit.

The logic control unit 210 is mounted in a protective enclosure 250, shown in FIGS. 1, 12 and 13. The protective enclosure 250 is supported on a flat plate 252 by three vibration dampers 254, 256 and 258. The flat plate 252 is attached to the bottom of two cross beams 28 by bolts 259. In this position the protective enclosure is under the guide beam assemblies 46 and between two cross beams 28 and is isolated from vibrations. The protective enclosure 250 can also be suspended under the flat plate 252 by vibration dampers 254, 256 and 258. The protective enclosure 250 has a terminal chamber 260 that extends across one end of the protective enclosure. The terminal chamber 260 has power input terminals that include a ground terminal 262 and two power input terminals 264 and 266 that are connected to the primary function control switch 208 by a cable 209 with leads 263, 265 and 267. One of the power input terminals 264 is for controlling the hydraulic floor slat drive system 136 to reciprocate the floor slats 50 and move material supported on the floor slats to the rear or to the front. The other power input terminal 266 supplies an operating voltage to the logic control unit 210. The operating voltage is supplied through the terminal 266 when the primary function control switch 208 is in the "rear" position as well as when the primary function control switch is in the "forward" position. Three terminals 268, 270 and 272 are provided for receiving signals from the three rear limit switches 174, 176 and 178. Three terminals 274, 276 and 278 are provided for receiving signals from the three front limit switches 180, 182 and 188. Six terminals 280, 282, 284, 286, 288 and 290 are provided for sending power to the solenoids 158, 160, 162, 168, 170 and 172 on the three solenoid actuated spool valves 152, 154 and 156. The leads from the logic control unit 210 to the solenoids 158, 160, 162, 168, 170 and 172 are in a cable 157. The leads from the logic control unit 210 to the limit switches 174, 176, 178, 180, 182 and 188 are in a cable 173. The terminal chamber is closed by a terminal chamber cover 292 that protects the terminals from dirt and moisture. The protective enclosure for the logic control unit 210 can be placed in any convenient location. The protective enclosure can be mounted in the operator's compartment of the towing vehicle as well as under the floor slats 50, as shown.

Control switch 208 can be implemented using a three position, double pole switch, with one of the poles being used to provide power to the solenoids, limit switches, and logic control unit 210 whenever control switch 208 is in either the front or rear position. The other pole can be used to provide logic control unit 210 with a signal indicative of the selected operating mode (i.e., forward or reverse).

As discussed above, movement of each group of floor slats 50 in either direction is achieved via solenoids 158, 160, 162, 168, 170, and 172, which control spool valves 152, 154, and 156 to direct hydraulic fluid into and out of hydraulic cylinders 116, 124, and 130, respectively. The solenoids 158, 160, 162, 168, 170 and 172 are selectively energized and deenergized by logic control unit (LCU) 210 in accordance with a predetermined forward or rearward sequence. Before describing the function of LCU 210, a description of the forward and rearward sequences of the three groups (A, B, and C) of floor slats 50 will be given with reference to FIGS. 9A, B, C and D and FIGS. 10A, B, C and D.

Figure 9A:
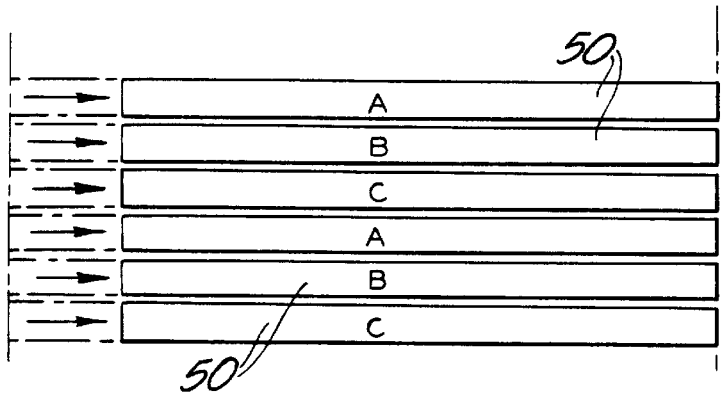
FIGS. 9A, B, C and D are a diagrammatic view of the steps involved in the rearward conveying sequence.
Figure 9B:
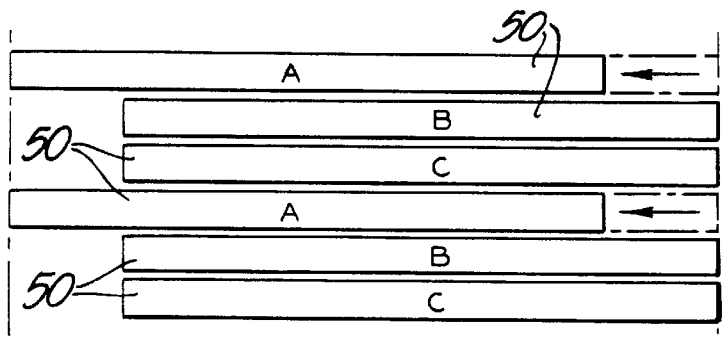
Figure 9C:
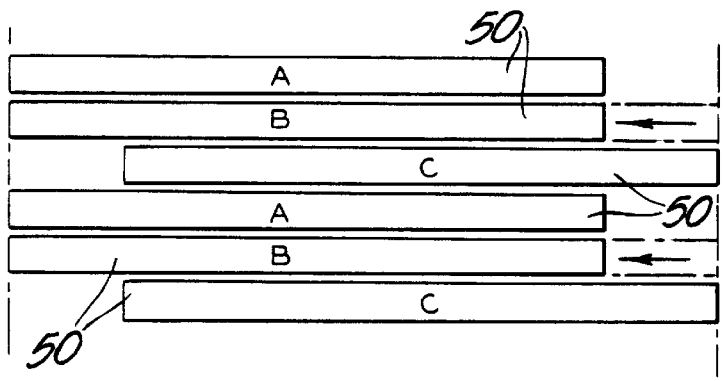
Figure 9D:
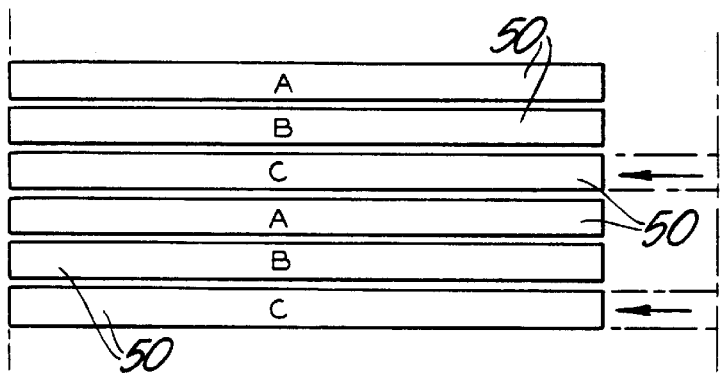

FIGS. 9A, B, C and D depict the rearward sequence that is activated when control switch 208 is placed in the rear position. Assuming that all three groups A, B and C of floor slats 50 are in the forward position, LCU 210 will operate the appropriate ones of the solenoids to move all three groups of floor slats 50 in unison to the rearward position, as shown in FIG. 9A, thereby simultaneously moving the items contained within the semitrailer 12 to the rear. After the three groups A, B and C have reached the rearward position, the group B and C floor slats 50 will be held in that position while the group A floor slats will return to the forward position, as indicated in FIG. 9B. As discussed above, for an item lying across multiple slats the static frictional engagement of that item with the stationary groups of floor slats will cause that item to remain in place while the remaining group of slats slides beneath it. Once the group A floor slats 50 have returned to the forward position, the group B slats will move to the forward position while the group A floor slats are held at the forward position and the group C floor slats are held at the rearward position, as indicated in FIG. 9C. Finally, once the group B floor slats have returned to the forward position, the group C floor slats will move to the forward position while the group A and B floor slats are held at the forward position, as indicated in FIG. 9D. At this point all of the groups A, B and C of slats 50 have returned to the forward position and the sequence repeats.

Figure 10A:
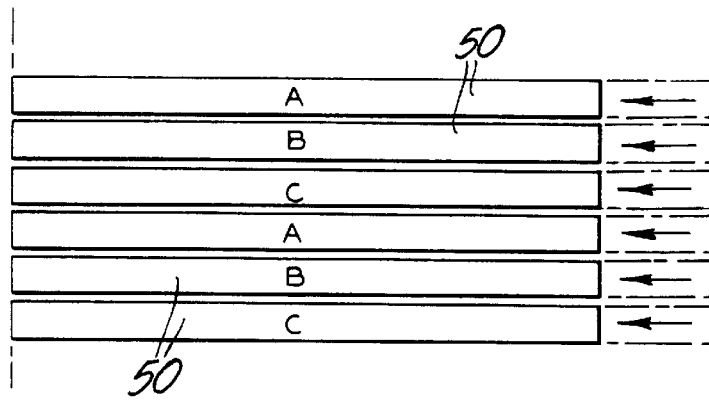
FIGS. 10A, B, C and D are a diagrammatic view of the steps involved in the forward conveying sequence.
Figure 10B:
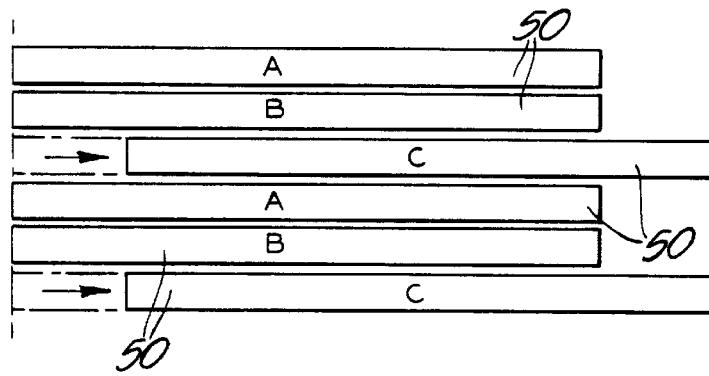
Figure 10C:
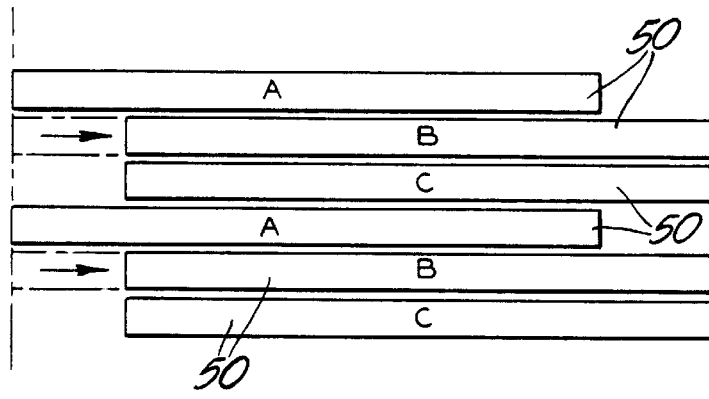
Figure 10D:
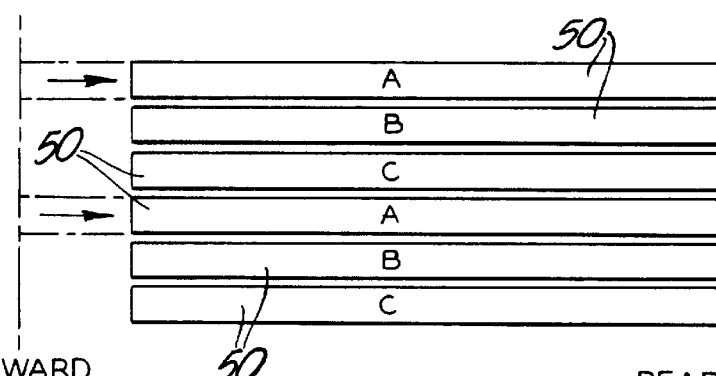

The forward sequence that is activated when control switch 208 is placed in the front position is the reverse of the rearward sequence and is shown in FIGS. 10A, B, C and D. Assuming that all three groups of floor slats 50 are in the rearward position, LCU 210 will cause all three groups of floor slats 50 to move in unison to the forward position, as shown in FIG. 10A, thereby simultaneously moving the items contained within the semitrailer 12 to the front. After the three groups A, B and C have reached the forward position, the group A and B floor slats will be held in that position while the group C floor slats will return to the rearward position, as indicated in FIG. 10B. Once the group C floor slats have returned to the rearward position, the group B floor slats will move to the rearward position while the group A floor slats are held at the forward position and the group C floor slats are held at the rearward position, as indicated in FIG. 10C. Finally, once the group B floor slats have returned to the rearward position, the group A floor slats will move to the rearward position while the group B and C floor slats are held at the rearward position, as indicated in FIG. 10D. At this point all of the groups A, B and C of floor slats 50 have returned to the rearward position and the sequence repeats.

Referring now to FIG. 11, LCU 210 is shown implemented using digital components. Of course, an analog or microprocessor based circuit could also be utilized to implement the function of LCU 210. In general, LCU 210 is responsive to control switch 208 and limit switches 174, 176, 178, 180, 182, and 188 to control solenoids 158, 160, 162, 168, 170, and 172. Control switch 208 provides LCU 210 with a signal indicative of the selected operating mode and each of the limit switches provide LCU 210 with a signal indicative of the position of one of the three groups of floor slats. As there are three groups of slats, each of which can be in either of two terminal positions, the six limit switches provide LCU 210 with the information necessary to determine the current state of the groups of slats and, using the signal from control switch 208, with the information necessary to determine the next step in the sequence selected via control switch 208. Using this information, LCU 210 operates the solenoids to control movement of the groups A, B and C of floor slats 50 in accordance with the appropriate sequence.

Each of the input signals to LCU 210 are inverted by opto-couplers that isolate the control switch 208 and limit switches' outputs from LCU 210. In particular, LCU 210 includes opto-coupler 212 connected to the output of the group A rear limit switch 174, opto-coupler 213 connected to the output of the group B rear limit switch 176, opto-coupler 214 connected to the output of the group C rear limit switch 178, opto-coupler 215 connected to the output of control switch 208, opto-coupler 216 connected to the output of the group A front limit switch 180, opto-coupler 217 connected to the output of the group B front limit switch 182, and opto-coupler 218 connected to the output of the group C front limit switch 188. Opto-couplers 212–218 include respective opto-isolators 212a–218a, such as in an NEC2501-4 quad opto-isolator, each of which has an LED and photo-transistor sensitive to the output of the LED to conduct current between its collector and emitter. The LED anodes of the opto-isolators 212a–218a are connected to the supply voltage VCC by respective resistors 212b–218b. The cathodes of these LEDs are also connected to VCC via respective pull-up resistors 212c–218c. The various outputs of the limit switches and control switch 208 are connected to the cathode of the LED of their associated opto-isolator. As will be appreciated, those switches cause current to flow through the LED of their associated opto-isolator whenever they connect the LED cathode to ground. The photo-transistor collectors of each of the opto-isolators 212a–218a are connected to VCC and the emitters provide the outputs of opto-couplers 212–218. These opto-coupler outputs are normally biased to a logical zero by pull-down resistors 212d–218d.

As indicated in FIG. 11, the opto-coupler outputs are labelled as follows:

| Opto-coupler | Output Signal | Description |
| --- | --- | --- |
| 212 | GAR | Group A slats at the Rear |
| 213 | GBR | Group B slats at the Rear |
| 214 | GCR | Group C slats at the Rear |
| 215 | F/R | Forward or Reverse mode |
| 216 | GAF | Group A slats at the Front |
| 217 | GBF | Group B slats at the Front |
| 218 | GCF | Group C slats at the Front |

A logical one on any of the outputs of opto-couplers 212–214 and 216–218 indicates that the limit switch connected to that opto-coupler has detected the presence of its corresponding group A, B or C of floor slats. A logical one on the output of opto-coupler 215 indicates that the rearward sequence has been selected and a logical zero on that output indicates that the forward sequence has been selected.

The outputs of opto-couplers 212–215 are connected as the inputs of a 1-of-16 decoder 220 and the outputs of opto-couplers 215–218 are connected as the inputs of a second 1-of-16 decoder 222. Decoders 220 and 222 can be a 74154 4-Line-To-16-Line Decoder/Demultiplexer, as made by Texas Instruments, Inc. The four inputs (A, B, C, D) of each decoder are treated as a four bit binary word with the A input being the least significant bit and the D input being the most significant bit. The A, B, and C inputs of decoder 220 correspond respectively to the group A, B, and C rear limit switches and thus, they are connected to receive the GAR, GBR, and GCR signals, respectively. Similarly, the A, B, and C inputs of decoder 222 correspond respectively to the group A, B, and C front limit switches and thus, they are connected to receive the GAF, GBF, and GCF signals, respectively. The D inputs of each decoder receives the F/R signal that indicates the selected direction of conveyance.

Since each of the two sequences involve four possible states, eight of the decoded outputs of decoder 220 are used to indicate the location of the three groups of slats, as determined by the rear limit switches 174, 176, and 178. These outputs are mutually exclusive and are active low. Thus, the state of the groups of slats as seen by the rear limit switches at any one time is represented by the one of the decoder 220 outputs that is at a low logic level. In a like manner, the outputs of decoder 222 depict the state of the groups of slats as determined by reference to the front limit switches 180, 182, and 188.

The eight (of the sixteen) decoder outputs used by LCU 210 are selected to correspond to the possible states achieved by the two sequences. Since the D input of each of the decoders 220 and 222 is the most significant bit and therefore equals a decimal 8, it will be appreciated that any outputs numbered less than 8 (i.e., outputs 0, 4, 6, and 7 of decoder 220 and outputs 0, 1, 3, and 7 of decoder 222) indicate that D=0 and therefore that control switch 208 is in the front position. Conversely, any of the outputs numbered 8 or greater indicate the D=1 and therefore that control switch 208 is in the rear position. It will also be appreciated that for each of the decoders, any two outputs differing in number by eight correspond to the same state of the groups of slats, the only difference being the sequence (forward or rearward) selected.

Thus, outputs 0 and 8 of decoder 220 correspond to the A, B, and C inputs of that decoder all being a logical zero, indicating that none of the groups of slats are at the rearward position. Outputs 4 and 12 of decoder 220 correspond to the A and B inputs being a logical zero and the C input being a logical one, indicating that only the group C slats are at the rearward position. Outputs 6 and 14 of decoder 220 correspond to the A input being a logical zero and the B and C inputs being a logical one, indicating that the group B and C slats are at the rearward position. Finally, outputs 7 and 15 of decoder 220 correspond to the A, B, and C inputs all being a logical one, indicating that all three groups of slats are at the rearward position. Similarly, with decoder 222, outputs 0 and 8 indicate that none of the groups of slats are at the forward position, outputs one and 9 indicate that only the group A slats are at the forward position, outputs 3 and 11 indicate that the group A and B slats are at the forward position, and outputs 7 and 15 indicate that all three groups of slats are at the forward position.

The state of the three groups A, B and C of floor slats 50 as determined by the rear limit switches and as indicated by the outputs of decoder 220 do not necessarily correspond with the state of the three groups of slats as determined by the front limit switches and as indicated by the outputs of decoder 222. That is, the fact that a particular one of the rear limit switches indicates that its corresponding group of slats is not at the rearward position does not necessarily mean that group of slats is at the forward position. Rather, it might be in transit between the two ends. Thus, since the state of the three groups of slats as indicated by the outputs of decoder 220 do not necessarily correspond with the state of the three groups of slats as indicated by the outputs of decoder 222, a set of two input OR gates 224–231 are used to compare the outputs of decoders 220 and 222 and to change the state of the solenoids (i.e., take the next step in the sequence) only when the two decoders agree on the state of the groups of slats. In this way, LCU 210 is operative to change the state of the solenoid only when each of the three groups of slats is detected by one of its associated limit switches. OR gates 224–231 maintain the active low convention of the outputs of decoders 220 and 222.

OR gates 224–227 correspond to the forward sequence and, more specifically, each of these OR gates correspond to one of the four possible states of the groups A, B and C of floor slats 50. When the groups A, B and C of floor slats reach one of the states indicated in FIGS. 10A, B, C or D, the output of the one of the OR gates 224–227 corresponding to that state changes to a logical zero. This logical zero is used in a manner to be described below to selectively energize and deenergize the appropriate solenoids to move the groups of slats to the next state in the forward sequence. Similarly, OR gates 228–231 correspond to the rearward sequence and, upon determining that the groups of slats are in one of the predefined states, are used to activate the solenoids to move the groups of slats to the next state in the sequence.

In particular, OR gate 224 is connected to receive output 0 of decoder 220 and output 7 of decoder 222 which, when both are a logical zero, indicates that the groups of slats are all at the forward position, as depicted in FIG. 10A. Thus, the next step is to move the group C slats to the rearward position, as shown in Figure 10B. Accordingly, the output of OR gate 224 (labelled C1) will be used to hold the groups A and B slats at the forward position while moving the group C slats to the rearward position. OR gate 225 receives output 4 of decoder 220 and output 3 of decoder 222 which when zero cause its output (C2) to indicate that the groups A, B and C of floor slats 50 are at the state shown in FIG. 10B and should be moved to the state shown in FIG. 10C. OR gate 226 receives output 6 of decoder 220 and output one of decoder 222 which when zero cause its output (C3) to indicate that the groups A, B and C of floor slats are at the state shown in FIG. 10C and should be moved to the state shown in FIG. 10D. OR gate 227 receives output 7 of decoder 220 and output 0 of decoder 222 which when zero cause its output (C4) to indicate that the groups A, B and C of floor slats 50 are at the state shown in FIG. 10D and should be moved to the state shown in FIG. 10A so that the forward sequence can be repeated.

Similarly, for the rearward sequence, OR gate 228 is connected to receive output 8 of decoder 220 and output 15 of decoder 222 which, when both are a logical zero, indicates that the groups A, B and C of floor slats 50 are all at the forward position, as depicted in FIG. 9D. Thus, the output (C5) of OR gate 228 will be used to carry out the next step in this sequence which, as shown in FIG. 9A, is to move all three groups of slats to the rearward position. OR gate 229 receives output 15 of decoder 220 and output 8 of decoder 222 which when zero cause its output (C6) to indicate that the groups of slats are at the state shown in FIG. 9A and should be moved to the state shown in FIG. 9B. OR gate 230 receives output 14 of decoder 220 and output 9 of decoder 222 which when zero cause its output (C7) to indicate that the groups A, B and C of floor slats 50 are at the state shown in FIG. 9B and should be moved to the state shown in FIG. 9C. OR gate 231 receives output 12 of decoder 220 and output 11 of decoder 222 which when zero cause its output (C8) to indicate that the groups A, B and C of floor slats 50 are at the state shown in FIG. 9C and should be moved to the state shown in FIG. 9D so that the rearward sequence can be repeated. Since no two of the OR gates 224–231 receive the same inputs, it will be appreciated that at any one time only one of the outputs of those OR gates will be a logical zero.

Outputs C1–C8 are used in various combinations by a set of AND gates 232–237 to control three R-S flip-flops 238, 239, and 240. Flip-flops 238, 239, and 240 are used to control spool valves 152, 154, and 156, respectively, via their solenoids. More specifically, the Q outputs of flip-flops 238, 239, and 240 control solenoids 158, 160, and 162, respectively, which when energized move the groups A, B, and C slats, respectively, to the rearward position. The ¬Q outputs of flip-flops 238, 239, and 240 control solenoids 168, 170, and 172, respectively, which when energized move the groups A, B, and C floor slats, respectively, to the forward position. Buffers and/or relays can be connected between the flip-flop outputs and the solenoids as needed to provide the necessary power to operate the solenoids.

AND gates 232–237 and the inputs of flip-flops 238–240 maintain the active low convention utilized by OR gates 224–231. Thus, to energize one of the solenoids 158, 160, and 162 to move the corresponding group A, B or C of floor slats 50 to the rearward position, the ¬S input of the corresponding flip-flop 238–240 is provided with a logical zero and its ¬R input with a logical one. Conversely, to energize one of the solenoids 168, 170, and 172 to move the corresponding group A, B or C of floor slats to the forward position, the ¬S input of the corresponding flip-flop 238–240 is provided with a logical one and its ¬R input with a logical zero.

The six AND gates 232–237 are grouped in three pairs, each of which controls one of the three flip-flops 238–240. One of the AND gates of each pair controls the ¬S input of its associated flip-flop (and thus, the rearward direction solenoid of its associated spool valve) and the other AND gate controls the ¬R input of its associated flip-flop (and thus, the forward direction solenoid of its associated spool valve). Specifically, the output of AND gate 232 is connected to the ¬S input of flip-flop 238 and, when a logical zero, causes flip-flop 238 to energize solenoid 158 to thereby move the group A floor slats to the rearward position. The output of AND gate 233 is connected to the ¬R input of flip-flop 238 and, when a logical zero, causes flip-flop 238 to energize solenoid 168 to thereby move the group A floor slats to the forward position. The output of AND gate 234 is connected to the ¬S input of flip-flop 239 and, when a logical zero, causes flip-flop 239 to energize solenoid 160 to thereby move the group B slats to the rearward position. The output of AND gate 235 is connected to the ¬R input of flip-flop 239 and, when a logical zero, causes flip-flop 239 to energize solenoid 170 to thereby move the group B floor slats to the forward position. The output of AND gate 236 is connected to the ¬S input of flip-flop 240 and, when a logical zero, causes flip-flop 240 to energize solenoid 162 to thereby move the group C floor slats to the rearward position. The output of AND gate 237 is connected to the ¬R input of flip-flop 240 and, when a logical zero, causes flip-flop 240 to energize solenoid 172 to thereby move the group C floor slats to the forward position.

As discussed above, each of the OR gate outputs C1–C4 represent one of the four steps in the forward sequence and each of the OR gate outputs C5–C8 represent one of the four steps in the rearward sequence. Thus, each of these OR gate outputs are connected to one of the AND gates of each pair of AND gates so that when that OR gate output indicates the next step to be taken, each flip-flop will be set or reset as needed to control its associated spool valve 152, 154 or 156. In particular, since a logical zero on output C1 indicates that the groups of slats are to be moved to the position shown in FIG. 10B, it is connected to inputs of AND gates 233 and 235, which causes flip-flops 238 and 239 to be reset so that solenoids 168 and 170 are energized to hold the group A and B slats at the forward position. It is also connected to an input of AND gate 236 so as to cause flip-flop 240 to be set so that solenoid 162 is energized to move the group C floor slats to the rearward position. OR gate output C2 indicates that the groups A, B and C of floor slats are to be moved to the position shown in FIG. 10C. Therefore, output C2 is connected to an input of AND gates 233, 234, and 236 so that flip-flop 238 will be reset to energize solenoid 168 and hold the group A floor slats at the forward position, flip-flop 239 will be set to energize solenoid 160 to move the group B floor slats to the rearward position, and flip-flop 240 will be set to maintain the group C floor slats at the rearward position. OR gate output C3 indicates that the groups of slats are to be moved to the position shown in FIG. 10D. Therefore, output C3 is connected to an input of AND gates 232, 234, and 236 so that flip-flop 238 will be set to energize solenoid 158 and move the group A floor slats to the rearward position and flip-flops 239 and 240 will be set to energize solenoids 160 and 162 to hold the group B and C floor slats at the rearward position. OR gate output C4 indicates that the groups A, B and C of floor slats are to be moved to the position shown in FIG. 10A. Therefore, output C4 is connected to an input of AND gates 233, 235, and 237 so that all three flip-flops will be reset to energize solenoids 168, 170, and 172 to simultaneously move all three groups A, B and C of floor slats to the forward position.

The outputs C5–C8 of OR gates 228–231 are similarly connected to AND gates 232–237 to operate the solenoids in the order needed to carry out the rearward sequence shown in FIG. 9A. In particular, OR gate output C5 indicates that the groups of slats are to be moved to the position shown in FIG. 9A. Therefore, output C5 is connected to an input of AND gates 232, 234, and 236 so that all three flip-flops will be set to energize solenoids 158, 160, and 162 to simultaneously move all three groups A, B and C of floor slats to the rearward position. OR gate output C6 indicates that the groups A, B and C of floor slats are to be moved to the position shown in FIG. 9B. Therefore, output C6 is connected to an input of AND gate 233, 234, and 236 so that flip-flop 238 will be reset to energize solenoid 168 to move the group A floor slats to the forward position and flip-flops 239 and 240 will be set to energize solenoids 160 and 162 to hold the group B and C floor slats at the rearward position. OR gate output C7 indicates that the groups A, B and C of floor slats are to be moved to the position shown in FIG. 9C. Therefore, output C7 is connected to an input of AND gates 233, 235, and 236 so that flip-flop 238 will be reset to energize solenoid 168 and hold the group A floor slats at the forward position, flip-flop 239 will be reset to energize solenoid 170 to move the group B floor slats to the forward position, and flip-flop 240 will be set to maintain the group C floor slats at the rearward position. Finally, OR gate output C8 indicates that the groups A, B and C of floor slats are to be moved to the position shown in FIG. 9D. Therefore, output C8 is connected to an input of AND gates 233, 235, and 237 so that flip-flop 240 will be reset to energize solenoid 172 to move the group C slats to the forward position while flip-flops 238 and 239 will be reset to energize solenoids 168 and 170 to hold the group A and B floor slats at the forward position.

It will thus be appreciated that for each of the pairs of AND gates 232–237, each of the outputs C1–C8 of the OR gates 224–231 are provided as inputs to one, but not both of the AND gates of that pair. Thus, since only one of the outputs C1–C8 are a logical zero at any one time, only one of the outputs of the AND gates of each of the pairs are at a logical zero at any one time. As a result, flip-flops 239–240 will not simultaneously energize both solenoids of their associated spool valves.

During execution of each step in both the forward and rearward sequences, one or more groups of slats are moved between the forward and rearward positions. During this motion, neither the front nor rear limit switches of the moving group(s) of slats will detect the presence of the moving group(s) of slats and, as discussed above, the state of the three groups A, B and C of floor slats 50 as indicated by decoder 220 will therefore not correspond to that indicated by decoder 222. Since the outputs of OR gates 224–231 only provide a logical zero when decoders 220 and 222 agree on the state of the three groups of slats, the outputs of OR gates 224–231 (and thus the outputs of AND gates 232–237) will all be a logical one during this time and will not provide any information concerning the next step to be taken. Therefore, this information must be stored before any of the groups of slats move away from its limit switch. This function is provided by flip-flops 238–240 which hold whatever data they contain when their inputs both become a logical one.

Upon power-up the state of flip-flops 238–240 may be unknown and the state of the groups of slats might not correspond to one of the four states recognized by OR gates 224–231. Thus, flip-flops 238, 239, and 240 each include a respective capacitor 242, 243, and 244 connected between its ¬R inputs and ground. Capacitors 242-244 each have a value (e.g., 10 $\mu$F) selected so as to hold the ¬R input at a logical zero long enough to reset the flip-flop when both of the AND gate outputs that control the flip-flop are a logical one. This causes each of the three groups A, B and C of floor slats 50 to move to the forward position, if not already there.

Once in that "start-up" position, LCU 210 will cause the three groups of slats to begin cycling through the selected sequence. This occurs because OR gate 224 recognizes the start-up position as one of the four states of the forward sequence and OR gate 228 recognizes the start-up position as one of the four states of the rearward sequence.

Preferred embodiments of the invention have been described in detail but are examples only and the invention is not restricted thereto. It will be easily understood by those skilled in the art that modifications and variations can easily be made within the scope of this invention.

I claim:

1. A reciprocating floor conveying and control system including a frame, a plurality of floor slats supported by the frame and moveable along parallel linear paths relative to the frame; a first hydraulic fluid linear actuator, having a first port and a second port, connected to the frame and at least one floor slat; a second hydraulic fluid linear actuator, having a first port and a second port, connected to the frame and at least one other floor slat; a source of hydraulic fluid under pressure; a hydraulic fluid sump connected to the source of hydraulic fluid under pressure; a first solenoid operated valve assembly connected to the source of hydraulic fluid and to the first linear actuator and having a first position in which the first port is connected to the source of hydraulic fluid under pressure and the second port is connected to the sump, and having a second position in which the first port is connected to the sump and the second port is connected to the source of hydraulic fluid under pressure and wherein the first solenoid operated valve assembly is operable to direct hydraulic fluid to the first linear actuator to reciprocate the first linear actuator back and forth; a second solenoid operated valve assembly connected to the source of hydraulic fluid and to the second linear actuator and having a first position in which the first port is connected to the source of hydraulic fluid under pressure and the second port is connected to the sump, and having a second position in which the first port is connected to the sump and the second port is connected to the source of hydraulic fluid under pressure and wherein the second solenoid operated valve assembly is operable to direct hydraulic fluid to the second linear actuator to reciprocate the second linear actuator back and forth; a front sensor supported by the frame and associated with the first linear actuator that is operable to indicate that the first linear actuator is in a front position; a rear sensor supported by the frame and associated with the first linear actuator that is operable to indicate that the first linear actuator is in a rear position; a front sensor supported by the frame and associated with the second linear actuator that is operable to indicate that the second linear actuator is in a front position; a rear sensor supported by the same and associated with the second linear actuator that is operable to indicate that the second linear actuator is in a rear position; a logic control unit connected to the first solenoid operated valve assembly, to the second solenoid operated valve assembly, to the front and rear sensors associated with the first linear actuator, and to the front and rear sensors associated with the second linear actuator and wherein the logic control unit is operable to control the first solenoid operated valve assembly and the second solenoid operated valve assembly to direct hydraulic fluid to the first linear actuator and the second linear actuator in a predetermined sequence that results in material supported on the floor slats moving toward one end of the floor slats; and wherein the logic control unit sends a signal to shift the first solenoid operated valve assembly between its first and second positions only when one of the front and rear sensors associated with the first linear actuator is closed and the other is open and one of the front and rear sensors associated with the second linear actuator is closed and the other is open, where none of said valve assemblies are switched between their first and second positions unless each of said linear actuator, is in one of their first and second positions.

2. A reciprocating floor conveyor and control system as set forth in claim 1 wherein the logic control unit includes opto-couplers that are connected to the sensors, a decoder connected to the opto-couplers, OR gates connected to the decoder, AND gates connected to the OR gates and flip-flops connected to the AND gates and to the solenoid operated valves.

3. A reciprocating floor conveyor and control system as set forth in claim 1 wherein the logic control unit is manipulable to change the direction material is conveyed by the reciprocating floor conveyor.

4. A reciprocating floor conveyor and control system as set forth in claim 2 wherein the logic control unit is manipulable to change the direction material is conveyed by the reciprocating floor conveyor.

5. A reciprocating floor conveyor and control system including a frame; a plurality of floor slats supported by the frame moveable along parallel linear paths relative to the frame; a first linear actuator connected to the frame and at least one floor slat; a second linear actuator connected to the frame and at least one other floor slat; a source of hydraulic fluid under pressure; a first solenoid operated valve connected to the source of hydraulic fluid and to the first linear actuator that is operable to direct hydraulic fluid to the first linear actuator to reciprocate the first linear actuator back and forth; a second solenoid operated valve connected to the source of hydraulic fluid and to the second linear actuator that is operable to direct hydraulic fluid to the second linear actuator to reciprocate the second linear actuator back and forth; a first front sensor mounted on the frame and associated with the first linear actuator that indicates when the first linear actuator is in a front position; a first rear sensor mounted on the frame and associated with the first linear actuator that indicates when the first linear actuator is in a rear position; a second front sensor mounted on the frame and associated with the second linear actuator that indicates when the second linear actuator is in a front position; a second rear sensor mounted on the frame and associated with the second linear actuator that indicates when the second linear actuator is in a rear position; and a logic control unit connected to the first solenoid operated valve, to the second solenoid operated valve, to the first front and first rear sensors associated with the first linear actuator, and to the second front and second rear sensors associated with the second linear actuator and wherein the logic control unit controls the first solenoid operated control valve and the second solenoid operated control valve to direct hydraulic fluid to the first linear actuator and to the second linear actuator in a predetermined sequence that results in material supported on the floor slats moving toward one end of the floor slats only in response to signals from both the first front sensor and the first rear sensor indicating that the first linear actuator is in a front position or a rear position and to signals from both the second front sensor and the second rear sensor indicating that the second linear actuator is in a front position or a rear position, whereby none of said valves are actuated by said control unit unless each of said linear actuators is in one of said front and rear positions.

6. A reciprocating floor conveyor and control system as set forth in claim 5 wherein the logic control unit includes opto-couplers that are connected to the sensors, a decoder connected to the opto-couplers, OR gates connected to the decoder, AND gates connected to the OR gates and flip-flops connected to the AND gates and to the solenoid operated valves.

7. A reciprocating floor conveyor and control system as set forth in claim 5 wherein the logic control unit is manipulable to change the direction material is conveyed by the reciprocating floor conveyor.

8. A reciprocating floor conveyor and control system, comprising;
    a frame;
    a plurality of floor slats supported by said frame, each of said floor slats being movable relative to said frame along a linear path between a forward and a rearward position;
    a first hydraulic linear actuator coupled between said frame and a first group of said floor slats, whereby actuation of said first actuator causes said first group of floor slats to move as a group relative to said frame;
    a second hydraulic linear actuator coupled between said frame and a second group of said floor slats, whereby actuation of said second actuator causes said second group of floor slats to move as a group relative to said frame;
    a first electronically controlled valve coupled to said first actuator to supply hydraulic fluid under pressure to said first valve, said first valve being movable between a first position, in which said first actuator moves said first group of floor slats in one direction, and a second position, in which said first actuator moves said first group of floor slats in an opposite direction;
    a second electronically controlled valve coupled to said second actuator to supply hydraulic fluid under pressure to said second valve, said second valve being movable between a first position, in which said second actuator moves said second group of floor slats in the one direction, and a second position, in which said second actuator moves said second group of floor slats in the opposite direction; and
    a control circuit electrically coupled to said first and second valves, wherein said control circuit is operable to switch said valves between said first and second positions and wherein, for each movement of each of said group of floor slats, said control circuit is operable to determine that each of said groups of floor slats is posItioned at either said forward or rearward position prior to switching any of said valves between said first and second positions.

9. A floor conveyor and control system as set forth in claim 8, wherein said control circuit moves said groups of floor slats according to a preselected sequence and wherein said control circuit includes a forward/reverse direction input and is operable to repetitively move said groups of floor slats according to said sequence when said direction input receives a forward direction signal and is operable to repetitively move said groups of slats according to the reverse of said sequence when said direction input receives said reverse direction signal.

10. A floor conveyor and control system as set forth in claim 8, further comprising first and second pairs of limit switches supported by said frame and electrically coupled to said control circuit, wherein said first pair of limit switches are operable to provide said control circuit with an indication of whether said first group of floor slats are located at either said forward or rearward positions, and wherein said second pair of limit switches are operable to provide said control circuit with an indication of whether said second group of floor slats are located at either said forward or rearward positions.

11. A floor conveyor and control system as set forth in claim 10, wherein said control circuit is operable to determine whether each of said limit switches is in an actuated or a non-actuated state and, wherein said control circuit is operable to switch at least one of said valves between its first and second positions in response to determining that certain ones of said limit switches are in their actuated state and the others of said limit switches are in their non-actuated state.

12. A floor conveyor and control system as set forth in claim 11, wherein said control circuit is operable to switch one or more of said valves between said first and second positions in response to any one of a plurality of preselected combinations of actuated and non-actuated states of said limit switches.

13. A floor conveyor and control system as set forth in claim 11, wherein said control circuit includes a forward/reverse direction input and wherein, when said direction input receives a forward direction signal, said control circuit is operable to switch one or more of said valves between said first and second positions in response to any one of a first plurality of preselected combinations of actuated and non-actuated states of said limit switches and, when said direction input receives a reverse direction signal, said control circuit is operable to switch one or more of said valves between said first and second positions in response to any one of a second plurality of preselected combinations of actuated and non-actuated states of said limit switches, wherein at least some of said first plurality of preselected combinations is different than at least some of said second plurality of preselected combinations.

14. A floor conveyor and control system as set forth in claim 10, wherein said control circuit is operable to determine whether each of said limit switches is in an actuated or a non-actuated state and, wherein said control circuit is operable to switch at least one of said valves between its first and second positions in response that determining that one of said limit switches from each of said pairs of limit switches is in its actuated state and the other of said limit switches from each of said pairs of limit switches is in its non-actuated state.

15. A floor conveyor and control system as set forth in claim 8, further comprising a third hydraulic linear actuator coupled between said frame and a third group of said floor slats, whereby actuation of said third actuator causes said third group of floor slats to move as a group relative to said frame;
    a third electronically controlled valve coupled to said third actuator to supply hydraulic fluid under pressure to said third valve, said third valve being movable between a first position, in which said third actuator moves said third group of floor slats in the one direction, and a second position, in which said third actuator moves said third group of floor slats in the opposite direction;
    said control circuit being electrically coupled to said third valve, wherein said control circuit is operable to switch said third valve between said first and second positions and wherein said control circuit is operable to determine that said third group of floor slats is positioned at either said forward or rearward position prior to switching any of said valves between said first and second positions.

16. A floor conveyor and control system as set forth in claim 15, further comprising a front limit switch for each of said groups of floor slats and a rear limit switch for each of said groups of floor slats;

wherein groups of two or more of said limit switches can be represented as a numeric value and wherein said control circuit is operable to generate signals associated with said numeric values and wherein said control circuit is operable to switch at least one of said valves between said first and second positions only in response to certain, preselected ones of said signals.

17. A floor conveyor and control system as set forth in claim 16, wherein one of said groups of limit switches comprises said front limit switches and another of said groups of limit switches comprises said rear limit switches.

18. A floor conveyor and control system as set forth in claim 17, wherein, for each of said groups of limit switches and for n groups of floor slats, said numeric value comprises an n+1 bit word that includes one bit for each of the limit switches within that group of limit switches and that includes one bit representative of a user-selected direction of conveyance.

19. A floor conveyor and control system as set forth in claim 18, wherein said first, second, and third groups of floor slats comprise all of said floor slats and wherein said control circuit further includes a forward/reverse direction input that provides said control circuit with the user-selected direction of conveyance.

20. A floor conveyor and control system as set forth in claim 19, wherein said control circuit comprises a digital logic circuit and said direction signal is used with said front limit switches to form a 4-bit binary word that is representative of a first numeric value, and said direction signal is used with said rear limit switches to form a 4-bit binary word that is representative of a second numeric value, wherein said 4-bit binary words together indicate the position of each group of floor slats and the selected direction of conveyance and wherein said control circuit is operable to switch at least one of said valves between said first and second positions only in response to certain, preselected combinations of said first and second numeric values.

21. A floor conveyor and control system as set forth in claim 19, wherein said control circuit comprises a logic control unit having combinational logic that produces control signals for said valves and having at least one storage device to latch said control signals while one or more of said groups of floor slats move between said forward and rearward positions.

\* \* \* \* \*

UNITED STATES PATENT AND TRADEMARK OFFICE
CERTIFICATE OF CORRECTION

PATENT NO.     :     5,839,568

DATED          :     November 24, 1998

INVENTOR(S)    :     Gary R. Clark

It is certified that errors appear in the above-identified patent and that said Letters Patent is hereby corrected as shown below:

Column 19, line 51, after "supported by the" delete "same" and insert therefor --frame--. Column 20, line 4, after "the other is open," delete "where" and insert therefor --whereby--. Column 20, line 6, after "each of said linear" delete "actuator," and insert therefor --actuators--. Column 21, lines 47 and 48, after "said groups of floor slats is" delete "posItioned" and insert therefor --positioned--.

Signed and Sealed this

Fourteenth Day of September, 1999

*Attest:*

Q. TODD DICKINSON

*Attesting Officer*         *Acting Commissioner of Patents and Trademarks*